(12) United States Patent
Lodefier et al.

(10) Patent No.: US 11,560,469 B2
(45) Date of Patent: Jan. 24, 2023

(54) POLYPROPYLENE COMPOSITION AND THERMOFORMED SHEET THEREOF

(71) Applicant: Total Research & Technology Feluy, Seneffe (BE)

(72) Inventors: Philippe Lodefier, Saint Avold (FR); Marc Dufrenoy, Ophain-Bois Seigneur Issac (BE); Julie Dubuisson, Beaumont, TX (US); Amélie Buffard, Joue-les-Tours (FR); Cristo Boukalidis, Sirault (BE)

(73) Assignee: Total Research & Technology Feluy, Seneffe (BE)

( * ) Notice: Subject to any disclaimer, the term of this patent is extended or adjusted under 35 U.S.C. 154(b) by 392 days.

(21) Appl. No.: 15/741,794

(22) PCT Filed: Jul. 14, 2016

(86) PCT No.: PCT/EP2016/066727
§ 371 (c)(1),
(2) Date: Jan. 4, 2018

(87) PCT Pub. No.: WO2017/009409
PCT Pub. Date: Jan. 19, 2017

(65) Prior Publication Data
US 2018/0201771 A1 Jul. 19, 2018

(30) Foreign Application Priority Data
Jul. 16, 2015 (EP) .................................... 15177076

(51) Int. Cl.
*C08L 23/14* (2006.01)
*C08J 3/00* (2006.01)
*C08J 5/18* (2006.01)
*B29C 51/02* (2006.01)
*B29K 23/00* (2006.01)
*B29K 105/00* (2006.01)

(52) U.S. Cl.
CPC ............. *C08L 23/14* (2013.01); *C08J 3/005* (2013.01); *C08J 5/18* (2013.01); *C08L 23/142* (2013.01); *B29C 51/02* (2013.01); *B29K 2023/12* (2013.01); *B29K 2105/256* (2013.01); *C08J 2323/14* (2013.01); *C08J 2423/12* (2013.01); *C08L 2203/30* (2013.01); *C08L 2205/02* (2013.01); *C08L 2205/025* (2013.01)

(58) Field of Classification Search
CPC ................................................. C08L 23/14
See application file for complete search history.

(56) References Cited

U.S. PATENT DOCUMENTS 5,686,533 A * 11/1997 Gahleitner ............. C08L 23/10
264/331.17
6,235,823 B1 5/2001 Ikeda et al.
6,586,531 B2 * 7/2003 Washiyama ............. C08L 23/12
525/191
6,642,317 B1 * 11/2003 Delaite .................. C08L 23/10
525/240
2004/0054098 A1 * 3/2004 Weng ..................... C08F 210/06
526/73
2009/0030098 A1 * 1/2009 Cagnani .................. C08L 23/08
526/348
2010/0301059 A1 * 12/2010 Kaarto .................... C08L 23/12
220/675
2013/0101771 A1 * 4/2013 Masarati ................. C08L 23/12
524/81

FOREIGN PATENT DOCUMENTS

| CN | 1568845 A | 1/2005 |
|---|---|---|
| DE | 3610644 A1 | 10/1986 |
| EP | 0152701 A1 | 8/1985 |
| EP | 0368577 A2 | 5/1990 |
| EP | 0942021 A1 | 9/1999 |
| JP | H0733895 A | 2/1995 |
| JP | H08144122 A | 6/1996 |
| JP | H11140719 A | 5/1999 |
| WO | 02/46300 A2 | 6/2002 |
| WO | 03/102069 A1 | 12/2003 |

(Continued)

OTHER PUBLICATIONS

International Search Report issued in PCT/EP2016/066727, dated Oct. 7, 2016, 3 pages.
J.L. Throne, "Understanding Thermoforming", 1999, Carl Hanser Verlag, p. 12.
G.J. Ray et al., "Carbon-13 Nuclear Magnetic Resonance Determination of Monomer Composition and Sequence Distributions in Ethylene-Propylene Copolymers Prepared with a Stereoregular Catalyst System", Macromolecules vol. 10, No. 4, 1977, pp. 773-778.
Blomenhofer et al., "Designer Nucleating Agents for Polypropylene", Macromolecules vol. 38, 2005, pp. 3688-3695.

(Continued)

*Primary Examiner* — Irina Krylova
(74) *Attorney, Agent, or Firm* — Amster, Rothstein & Ebenstein LLP

(57) ABSTRACT

The present invention relates to a polypropylene composition for thermoforming comprising:
from 50% by weight to at most 90% by weight of a polypropylene A, wherein polypropylene A is a polypropylene random copolymer, based on the total weight of the polypropylene composition; and
from 10% by weight to at most 50% by weight of a polypropylene B, wherein polypropylene B is a polypropylene homopolymer, based on the total weight of the polypropylene composition; wherein the melt flow index of polypropylene B is at most 1.0 g/10 min, as measured according to the method of standard ISO 1133, condition M, at 230° C. and under a load of 2.16 kg; and
wherein the ratio of the melt flow index of polypropylene A to the melt flow index of polypropylene B is at least 80.

10 Claims, 5 Drawing Sheets

(56) References Cited

FOREIGN PATENT DOCUMENTS

| WO | 2004/072168 | A2 | 8/2004 |
| WO | 2006026745 | A1 | 3/2006 |
| WO | 2011131637 | A1 | 10/2011 |

OTHER PUBLICATIONS

Plastics Additives Handbook, ed. H. Zweifel, 5th edition, 2001, Hanser Publishers.
Y.D Zhang et al, "13C NMR, GPC, and DCS Study on a Propylene-ethylene-1-butene Terpolymer Fractionated by Termperature Rising Elution Fractionation" Polymer Journal, vol. 35, n° 7, 2003, p. 551-559.

\* cited by examiner

POLYPROPYLENE COMPOSITION AND THERMOFORMED SHEET THEREOF

CROSS-REFERENCE TO RELATED APPLICATIONS

This application claims the benefit of PCT/EP2016/066727 filed Jul. 14, 2016, which claims priority from EP 15177076.5 filed Jul. 16, 2015, which are incorporated herein by reference in their entireties for all purposes.

FIELD OF INVENTION

The present invention relates to a polypropylene composition. The present invention relates to a process for preparing a polypropylene composition. The present invention relates to a thermoformed article comprising a polypropylene composition. The present invention relates to a process for preparing a thermoformed article comprising a polypropylene composition.

BACKGROUND OF THE INVENTION

Polystyrene is often used to prepare containers for dairy products, such as for yoghurts and puddings. Polystyrene containers are typically formed using a thermoforming process called "Form, Fill, and Seal" (FFS), whereby the forming of the containers, the filling with a dairy product, and the sealing of the container with a lid, are all performed on the same line. Polystyrene has the advantage that it is flexible enough so that it can be easily thermoformed into cups or containers. At the same time, it maintains a certain rigidity, which allows multiple cups to be formed attached to one another, whereby the multiple cups can be easily separated into individual cups by cracking the polystyrene.

However, the polystyrene price is susceptible to irregular market fluctuations, such that the total cost of the containers cannot easily be predicted. Furthermore, polystyrene lacks resistance against fats.

Historically, amorphous polymers are preferred in thermoforming because they have a broader processing window than (semi-)crystalline polymers. Polystyrene, for example, can be thermoformed at a temperature between 127° C. and 180° C., i.e. it has a processing window of more than 50° C. By contrast, polypropylene becomes too fluid above its melting temperature and hence generally is thermoformed at a temperature which must be below the melting point but sufficiently high to be thermoformable. The processing window of polypropylene is therefore only about 3° C. (see J. L. Throne, Understanding Thermoforming, Carl Hanser Verlag, Munich, 1999, page 12).

Polypropylene, however, is of great interest because it offers good mechanical and chemical properties in combination with good economics. Thermoforming companies as well as polymer producers have therefore undertaken major research and development efforts to render polypropylene more suitable for use in thermoforming. So far, however, all efforts to broaden the processing window of polypropylene in thermoforming have been unsuccessful.

There still remains a need in the industry for polypropylenes with improved processability in thermoforming, preferably without sacrificing other properties, such as for example processability in the melt-extrusion step or mechanical properties of the final thermoformed articles. There also remains a need in the industry for polypropylenes that allow an increase in output and productivity of a thermoforming unit.

SUMMARY OF THE INVENTION

It is therefore an object of the present invention to provide a polypropylene composition that is suited for thermoforming. It is also an object of the present invention to provide a polypropylene composition with improved processability in thermoforming. It is a further object of the present invention to provide a polypropylene composition with good optical properties. Furthermore, it is an object of the present invention to provide a polypropylene composition with good mechanical properties. In addition, it is an object of the present invention to provide a polypropylene composition having good mechanical and optical properties in combination with good processability, particularly processability in thermoforming.

The present invention provides the solution to one or more of the aforementioned needs. Preferred embodiments of the invention provide the solution to one or more of the aforementioned needs.

According to a first aspect, the present invention provides a polypropylene composition comprising at least two polypropylenes A and B; wherein the polypropylene composition comprises
at least 50% by weight to at most 90% by weight of polypropylene A, based on the total weight of the polypropylene composition; and at least 10% by weight to at most 50% by weight of polypropylene B, based on the total weight of the polypropylene composition;
wherein the melt flow index of polypropylene B is at most 1.0 g/10 min as measured according to the method of standard ISO 1133, condition M, at 230° C. and under a load of 2.16 kg; and
wherein the ratio of the melt flow index of polypropylene A to the melt flow index of polypropylene B is at least 20.

According to a second aspect, the present invention provides a process for preparing a polypropylene composition according to the first aspect of the invention and preferred embodiments thereof, comprising the steps of:
i) providing a polypropylene A;
ii) providing a polypropylene B, wherein the melt flow index of polypropylene B is at most 1.0 g/10 min, and wherein the ratio of the melt flow index of polypropylene A to the melt flow index of polypropylene B is at least 20;
iii) blending at least 50% by weight to at most 90% by weight of polypropylene A, with at least 10% by weight to at most 50% by weight of polypropylene B, with % by weight based on the total weight of the polypropylene composition, into a polypropylene composition.

According to a third aspect, the present invention provides an article comprising the polypropylene composition according to the first aspect of the invention and preferred embodiments thereof. The present invention also encompasses mono-layered or multilayered articles.

According to a fourth aspect, the present invention provides a thermoformable sheet comprising the polypropylene composition according to the first aspect of the invention and preferred embodiments thereof.

According to a fifth aspect, the present invention provides a process for preparing an article according to the third or fourth aspect of the invention and preferred embodiments thereof, comprising the steps of:
a) providing a polypropylene composition according the first aspect of the invention and preferred embodiments thereof; or prepared according to the second aspect of the invention and preferred embodiments thereof;
b) forming a sheet with the polypropylene composition obtained in step a);

c) thermoforming the sheet formed in step b) into an article according to the third or fourth aspect of the invention and preferred embodiments thereof.

The present invention will now be further described. In the following passages, different aspects of the invention are defined in more detail. Each aspect so defined may be combined with any other aspect or aspects unless clearly indicated to the contrary. In particular, any feature or statement indicated as being preferred or advantageous may be combined with any other feature or statements indicated as being preferred or advantageous.

DETAILED DESCRIPTION OF THE INVENTION

Figure 1:
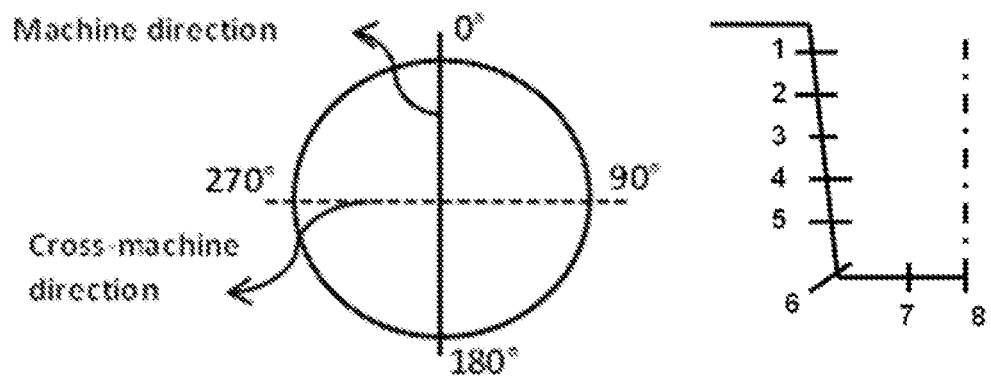
FIG. 1 represents a schematic top view and partial cross-section view of a cup, showing the measurement points in the machine direction and cross-machine direction on the cup, used in the thickness measurement graphs.

Before the present method used in the invention is described, it is to be understood that this invention is not limited to particular polymers, articles, and processes described, as such polymers, articles, and processes may, of course, vary. It is also to be understood that the terminology used herein is not intended to be limiting, since the scope of the present invention will be limited only by the appended claims.

When describing the polymers, articles, and processes of the invention, the terms used are to be construed in accordance with the following definitions, unless a context dictates otherwise.

As used herein, the singular forms "a", "an", and "the" include both singular and plural referents unless the context clearly dictates otherwise. By way of example, "a composition" means one composition or more than one composition.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims and statements, any of the embodiments can be used in any combination.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention.

Preferred statements (features) and embodiments of the compositions, articles, processes and uses of this invention are set herein below. Each statement and embodiment of the invention so defined may be combined with any other statement and/or embodiments unless clearly indicated to the contrary. In particular, any feature indicated as being preferred or advantageous may be combined with any other feature or features or statements indicated as being preferred or advantageous. Hereto, the present invention is in particular captured by any one or any combination of one or more of the below numbered aspects and embodiments 1 to 59 with any other statement and/or embodiments.

1. A polypropylene composition comprising:
   from 50% by weight to at most 90% by weight of a polypropylene A, based on the total weight of the polypropylene composition; and
   from 10% by weight to at most 50% by weight of polypropylene B, based on the total weight of the polypropylene composition;
   wherein the melt flow index of polypropylene B is at most 1.0 g/10 min as measured according to the method of standard ISO 1133, condition M, at 230° C. and under a load of 2.16 kg; and
   wherein the ratio of the melt flow index of polypropylene A to the melt flow index of polypropylene B is at least 20, preferably at least 30, preferably at least 40.

2. The polypropylene composition according to statement 1, wherein the ratio of the melt flow index of polypropylene A to the melt flow index of polypropylene B is at least 50, preferably at least 60, preferably at least 70, preferably at least 80, preferably at least 90, preferably at least 100, preferably at least 110, preferably at least 120, for example at least 130.
3. The polypropylene composition according to any one of statements 1 to 2, wherein polypropylene A is a polypropylene random copolymer.
4. The polypropylene composition according to any one of statements 1 to 3, wherein polypropylene A comprises at least 1.0% ethylene, preferably at least 1.5% ethylene, preferably at least 2.0% ethylene, more preferably at least 2.5% ethylene, for example at least 3.0% ethylene, as measured by $^{13}$C NMR.
5. The polypropylene composition according to any one of statements 1 to 4, wherein polypropylene A comprises at most 8.0% ethylene, for example at most 7.0% ethylene, for example at most 6.0% ethylene, for example at most 5.0% ethylene, for example at most 4.0% ethylene, as measured by $^{13}$C NMR.
6. The polypropylene composition according to any one of statements 1 to 5, wherein polypropylene A comprises at least 2.5% and at most 8.0% ethylene, for example at least 2.5% and most 7.0% ethylene, for example at least 3.0% and at most 6.0% ethylene, for example at least 3.0% and at most 5.0% ethylene, for example at least 3.0% and at most 4.0% ethylene, as measured by $^{13}$C NMR.
7. The polypropylene composition according to any one of statements 1 to 6, wherein polypropylene B is a polypropylene homopolymer.
8. The polypropylene composition according to any one of statements 1 to 7, comprising from 50% by weight to at most 90% by weight of a polypropylene A, wherein said polypropylene A is a polypropylene random copolymer; and from 10% by weight to at most 50% by weight of polypropylene B, wherein polypropylene B is a polypropylene homopolymer. In an embodiment said composition therefore comprises 50% by weight to at most 90% by weight of a polypropylene random copolymer; and from 10% by weight to at most 50% by weight of a polypropylene homopolymer, wherein the melt flow index of said polypropylene homopolymer is at most 1.0 g/10 min as measured according to the method of standard ISO 1133, condition M, at 230° C. and under a load of 2.16 kg; and wherein the ratio of the melt flow index of said polypropylene random copolymer to the melt flow index of said polypropylene homopolymer is at least 20, preferably at least 30, preferably at least 40, preferably at least 50, preferably at least 60, preferably at least 70, preferably at least 80, preferably at least 90, preferably at least 100, preferably at least 110, preferably at least 120, for example at least 130.
9. The polypropylene composition according to any one of statements 1 to 8, wherein the difference between the melting point of polypropylene B and the melting point of polypropylene A is at least 5.0° C., with the melting point being measured with DSC at 10° C./min, preferably the difference between the melting point of polypropylene B and the melting point of polypropylene A is at least 6.0° C., preferably at least 7.0° C., preferably at least 8.0° C., preferably at least 9.0° C., preferably at least 10.0° C.
10. The polypropylene composition according to any one of statements 1 to 9, wherein the difference between the melting point of polypropylene B and the melting point of polypropylene A is at least 10.0° C., with the melting point being measured according to ISO 3146, preferably the difference between the melting point of polypropylene B and the melting point of polypropylene A is at least 11.0° C., preferably at least 12.0° C., preferably at least 13.0° C., preferably at least 14.0° C.
11. The polypropylene composition according to any one of statements 1 to 10, wherein the melt flow index of polypropylene B is at most 0.90 g/10 min, preferably at most 0.85 g/10 min, preferably at most 0.80 g/10 min, preferably at most 0.75 g/10 min, preferably at most 0.70 g/10 min, preferably at most 0.60 g/10 min, for example at most 0.50 g/10 min, for example at most 0.40 g/10 min.
12. The polypropylene composition according to any one of statements 1 to 11, wherein the melt flow index of polypropylene A is at least 10.0 g/10 min, preferably at least 15 g/10 min, preferably at least 20 g/10 min, preferably at least 25 g/10 min, preferably at least 30 g/10 min, preferably at least 35 g/10 min, for example at least 40 g/10 min.
13. The polypropylene composition according to any one of statements 1 to 12, comprising from 50% by weight to at most 88% by weight of polypropylene A, and from 12% by weight to at most 50% by weight of polypropylene B, preferably comprising from 50% by weight to at most 85% by weight of polypropylene A, and from 15% by weight to at most 50% by weight of polypropylene B, for example from 60% by weight to at most 85% by weight of polypropylene A, and from 15% by weight to at most 40% by weight of polypropylene B, for example from 70% by weight to at most 85% by weight of polypropylene A, and from 15% by weight to at most 30% by weight of polypropylene B, for example from 70% by weight to at most 82% by weight of polypropylene A, and from 18% to at most 30% by weight of polypropylene B.
14. The polypropylene composition according to any one of statements 1 to 12, comprising from 60% by weight to at most 90% by weight of polypropylene A, and from 10% by weight to at most 40% by weight of polypropylene B, for example from 70% by weight to at most 90% by weight of polypropylene A and from 10% by weight to at most 30% by weight of polypropylene B, for example from 75% by weight to at most 90% by weight of polypropylene A, and from 10% by weight to at most 25% by weight of polypropylene B, for example from 75% by weight to at most 85% by weight of polypropylene A, and from 15% by weight to at most 25% by weight of polypropylene B.
15. The polypropylene composition according to any one of statements 1 to 14, wherein polypropylene A is a polypropylene random copolymer and wherein polypropylene B is a polypropylene homopolymer.
16. The polypropylene composition according to any one of statements 1 to 15, further comprising a nucleating agent.
17. The polypropylene composition according to any one of statements 1 to 16, further comprising an alpha-nucleating agent.
18. The polypropylene composition according to any one of statements 1 to 17, wherein the melt flow index of the polypropylene composition is at least 1.0 g/10 min.
19. The polypropylene composition according to any one of statements 1 to 18, wherein the melt flow index of the polypropylene composition is at most 30 g/10 min.
20. The polypropylene composition according to any one of statements 1 to 19, wherein the melt flow index of the polypropylene composition is at least 2.0 g/10 min.

21. The polypropylene composition according to any one of statements 1 to 20, wherein the melt flow index of the polypropylene composition is at most 25 g/10 min.
22. The polypropylene composition according to any one of statements 1 to 21, wherein the melt flow index of the polypropylene composition is at least 5.0 g/10 min.
23. The polypropylene composition according to any one of statements 1 to 22, wherein the melt flow index of the polypropylene composition is at most 20 g/10 min.
24. The polypropylene composition according to any one of statements 1 to 19, wherein the melt flow index of the polypropylene composition is at least 1.0 g/10 min and at most 30 g/10 min, for example at least 2.0 g/10 min and at most 25 g/10 min, for example at least 5.0 g/10 min and at most 20 g/10 min.
25. A process for preparing a polypropylene composition according to any one of statements 1 to 24, comprising the steps of:
    i) providing a polypropylene A;
    ii) providing a polypropylene B, wherein the melt flow index of polypropylene B is at most 1.0 g/10 min, and wherein the ratio of the melt flow index of polypropylene A to the melt flow index of polypropylene B is at least 20;
    iii) blending at least 50% by weight to at most 90% by weight of polypropylene A, with at least 10% by weight to at most 50% by weight of polypropylene B, with % by weight based on the total weight of the composition, into a polypropylene composition.
26. The process according to statement 25, wherein the ratio of the melt flow index of polypropylene A to the melt flow index of polypropylene B is at least 50, preferably at least 100.
27. The process according to any one of statements 25 to 26, wherein in step (iii) at least 50% by weight to at most 88% by weight of polypropylene A is blended with at least 12% by weight to at most 50% by weight of polypropylene B, preferably at least 50% by weight to at most 85% by weight of polypropylene A is blended with at least 15% by weight to at most 50% by weight of polypropylene B, for example at least 60% by weight to at most 85% by weight of polypropylene A is blended with at least 15% by weight to at most 40% by weight of polypropylene B, for example at least 70% by weight to at most 85% by weight of polypropylene A is blended with at least 15% by weight to at most 30% by weight of polypropylene B, for example at least 70% by weight to at most 82% by weight of polypropylene A is blended with at least 18% to at most 30% by weight of polypropylene B.
28. The process according to any one of statements 25 to 26, wherein in step (iii) at least 60% by weight to at most 90% by weight of polypropylene A is blended with at least 10% by weight to at most 40% by weight of polypropylene B, for example at least 70% by weight to at most 90% by weight of polypropylene A is blended with at least 10% by weight to at most 30% by weight of polypropylene B, for example at least 75% by weight to at most 90% by weight of polypropylene A is blended with at least 10% by weight to at most 25% by weight of polypropylene B, for example at least 75% by weight to at most 85% by weight of polypropylene A is blended with at least 15% by weight to at most 25% by weight of polypropylene B.
29. An article comprising the polypropylene composition according to any one of statements 1 to 24, or an article comprising the polypropylene composition prepared according to the process according to any one of statements 25 to 28.
30. The article according to statement 29, wherein the article is a thermoformable article.
31. The article according to statement 29, wherein the article is a thermoformed article.
32. A thermoformable article comprising a polypropylene composition, said composition comprising:
    from 50% by weight to at most 90% by weight of a polypropylene A, based on the total weight of the polypropylene composition; and
    from 10% by weight to at most 50% by weight of polypropylene B, based on the total weight of the polypropylene composition;
    wherein the melt flow index of polypropylene B is at most 1.0 g/10 min as measured according to the method of standard ISO 1133, condition M, at 230° C. and under a load of 2.16 kg; and
    wherein the ratio of the melt flow index of polypropylene A to the melt flow index of polypropylene B is at least 20, preferably at least 30, preferably at least 40, preferably at least 100.
33. The thermoformable article according to statement 32, comprising a polypropylene composition according to any one of statements 1 to 24.
34. A thermoformable sheet comprising a polypropylene composition, said composition comprising
    from 50% by weight to at most 90% by weight of a polypropylene A, based on the total weight of the polypropylene composition; and from 10% by weight to at most 50% by weight of polypropylene B, based on the total weight of the polypropylene composition; wherein the melt flow index of polypropylene B is at most 1.0 g/10 min as measured according to the method of standard ISO 1133, condition M, at 230° C. and under a load of 2.16 kg; and wherein the ratio of the melt flow index of polypropylene A to the melt flow index of polypropylene B is at least 20, preferably at least 30, preferably at least 40, preferably at least 100.
35. The thermoformable sheet according to statement 34, comprising a polypropylene composition according to any one of statements 1 to 24.
36. Process for preparing an article or sheet according to any one of statements 29 to 35, comprising the steps of:
    a) providing a polypropylene composition according to any one of statements 1 to 24;
    b) forming a sheet or plate with the polypropylene composition of step a);
    c) thermoforming the sheet or plate formed in step b) into an article according to any one of statements 29 to 35.
37. Process according to statement 36, wherein the sheet formed in step b) has a thickness of at least 0.2 mm and at most 2.0 mm.
38. Process according to any one of statements 36 or 37, wherein step c) is performed in a form-fill-and-seal (FFS) line.
39. A polypropylene composition, preferably according to any one of statements 1 to 24, for thermoforming comprising:
    from 50% by weight to at most 90% by weight of a polypropylene A, wherein polypropylene A is a polypropylene random copolymer, based on the total weight of the polypropylene composition; and
    from 10% by weight to at most 50% by weight of a polypropylene B, wherein polypropylene B is a polypropylene homopolymer, based on the total weight of the polypropylene composition; wherein the melt flow index of polypropylene B is at most 1.0 g/10 min, as measured according to the method of standard ISO 1133, condition M, at 230° C. and under a load of 2.16 kg; and wherein the ratio of the melt flow index of polypropylene A to the melt flow index of polypropylene B is at least 80.

40. The polypropylene composition according to any one of statements 1 to 24 or statement 39, wherein the ratio of the melt flow index of polypropylene A to the melt flow index of polypropylene B is at least 100.

41. The polypropylene composition according to any one of statements 1 to 24 or any one of statements 39 to 40, wherein polypropylene A comprises at least 1.0 wt % of one or more co-monomers.

42. The polypropylene composition according to any one of statements 1 to 24 or any one of statements 39 to 41, wherein polypropylene A comprises up to 8.0% of one or more co-monomers, preferably up to 5.0% of one or more co-monomers, preferably up to 4.0 wt % of one or more co-monomers.

43. The polypropylene composition according to any one of statements 1 to 24 or any one of statements 39 to 42, wherein polypropylene B comprises at most 0.2% of co-monomer, preferably at most 0.1% of co-monomer, preferably at most 0.05% of co-monomer, preferably at most 0.02% of co-monomer, preferably at most 0.01% of co-monomer.

44. The polypropylene composition according to any one of statements 1 to 24 or any one of statements 39 to 43, wherein polypropylene B comprises at most 0.2% of ethylene, preferably at most 0.1% of ethylene, preferably at most 0.05% of ethylene, preferably at most 0.02 of ethylene, preferably at most 0.01% of ethylene.

45. The polypropylene composition according to any one of statements 1 to 24 or any one of statements 39 to 44, wherein the difference between the melting point of polypropylene B and the melting point of polypropylene A is at least 5.0° C., preferably at least 7.0° C., with the melting point being measured according to ISO 3146.

46. The polypropylene composition according to any one of statements 1 to 24 or any one of statements 39 to 45, wherein the melt flow index of polypropylene B is at most 0.85 g/10 min, preferably at most 0.70 g/10 min, preferably at most 0.75 g/10 min, preferably at most 0.6 g/10 min.

47. The polypropylene composition according to any one of statements 1 to 24 or any one of statements 39 to 46, wherein the melt flow index of polypropylene B is at most 0.85 g/10 min, preferably at most 0.70 g/10 min, preferably at most 0.75 g/10 min, preferably at most 0.6 g/10 min.

48. The polypropylene composition according to any one of statements 1 to 24 or any one of statements 39 to 47, wherein the melt flow index of polypropylene B is at least 0.15 g/10 min, for example at least 0.20 g/10 min, for example at least 0.25 g/10 min.

49. The polypropylene composition according to any one of statements 1 to 24 or any one of statements 39 to 48, wherein the melt flow index of polypropylene A is at least 10.0 g/10 min, preferably at least 20 g/10 min, preferably at least 30 g/10 min, preferably at least 35 g/10 min, for example at least 40 g/10 min.

50. The polypropylene composition according to any one of statements 1 to 24 or any one of statements 39 to 49, wherein the polypropylene composition comprises at least 75% by weight to at most 90% by weight of polypropylene A, and at least 10% by weight to at most 25% by weight of polypropylene B.

51. The polypropylene composition according to any one of statements 1 to 24 or any one of statements 39 to 50, wherein the melt flow index of the polypropylene composition is at least 1.0 g/10 min and at most 30 g/10 min, preferably at least 2.0 g/10 min and at most 25 g/10 min, preferably at least 5.0 g/10 min and at most 20 g/10 min as measured according to the method of standard ISO 1133, condition M, at 230° C. and under a load of 2.16 kg.

52. The polypropylene composition according to any one of statements 1 to 24 or any one of statements 39 to 51, wherein the ratio of the melt flow index of polypropylene A to the melt flow index of polypropylene B is at least 85, for example at least 95, for example at least 105.

53. The polypropylene composition according to any one of statements 1 to 24 or any one of statements 39 to 52, wherein the ratio of the melt flow index of polypropylene A to the melt flow index of polypropylene B is at least 85, for example at least 95, for example at least 105.

54. A process for preparing a polypropylene composition according to any one of statements 1 to 24 or any one of statements 39 to 53, comprising the steps of:
 i) providing a polypropylene A, wherein polypropylene A is a polypropylene random copolymer;
 ii) providing a polypropylene B, wherein polypropylene B is a polypropylene homopolymer, wherein the melt flow index of polypropylene B is at most 1.0 g/10 min, and wherein the ratio of the melt flow index of polypropylene A to the melt flow index of polypropylene B is at least 80;
 iii) blending at least 50% by weight to at most 90% by weight of polypropylene A, with at least 10% by weight to at most 50% by weight of polypropylene B, with % by weight based on the total weight of the polypropylene composition, into a polypropylene composition.

55. An article comprising the polypropylene composition according to any one of statements 1 to 24 or any one of statements 39 to 53, preferably wherein the article is a thermoformable or thermoformed article.

56. A thermoformed article comprising a polypropylene composition, preferably a polypropylene composition according to any one of statements 1 to 24 or any one of statements 39 to 53, the polypropylene composition comprising:
 from 50% by weight to at most 90% by weight of a polypropylene A, based on the total weight of the polypropylene composition; and
 from 10% by weight to at most 50% by weight of a polypropylene B, based on the total weight of the polypropylene composition; wherein the melt flow index of polypropylene B is at most 1.0 g/10 min, as measured according to the method of standard ISO 1133, condition M, at 230° C. and under a load of 2.16 kg; and
 wherein the ratio of the melt flow index of polypropylene A to the melt flow index of polypropylene B is at least 20.

57. A thermoformable sheet comprising the polypropylene composition according to any one of statements 1 to 24 or any one of statements 39 to 53.

58. A process for preparing an article according to any one of statements 29 to 33 or any one of statements 55 or 56, the process comprising the steps of:
 a) providing a polypropylene composition according to any one of statements 1 to 24 or any one of statements 39 to 53; or as prepared according to any one of statements 25 to 28 or 54, or as defined in statement 56;

b) forming a sheet with the polypropylene composition obtained in step a);

c) thermoforming the sheet formed in step b) into an article according to any one of statements 29 to 33 or any one of statements 55 or 56.

59. Process according to statement 58, wherein step c) is performed in a form-fill-and-seal line.

Throughout the present application the terms "polypropylene" and "propylene polymer" may be used synonymously.

Throughout the present application the terms "forming" and "shaping" may be used synonymously.

According to a first aspect, the present invention provides a polypropylene composition comprising at least two polypropylenes A and B. The polypropylene composition comprises at least 50% by weight to at most 90% by weight of polypropylene A, with % by weight based on the total weight of the composition. The polypropylene composition comprises at least 10% by weight to at most 50% by weight of polypropylene B. The melt flow index of polypropylene B is at most 1.0 g/10 min. The ratio of the melt flow index of polypropylene A to the melt flow index of polypropylene B is at least 20, preferably at least 50, more preferably at least 100. The melt flow index for polypropylene is measured according to the method of standard ISO 1133, condition M, at 230° C. and under a load of 2.16 kg.

In some preferred embodiments, polypropylene A is a random copolymer. The one or more comonomers are preferably selected from the group consisting of ethylene and $C_4$-$C_{10}$ alpha-olefins, such as for example 1-butene, 1-pentene, 1-hexene, 1-octene, or 4-methyl-1-pentene. Ethylene and 1-butene are the preferred comonomers. Ethylene is the most preferred comonomer.

In some embodiments, polypropylene random copolymer A comprises up to 8.0% of one or more co-monomers, preferably up to 5.0% of one or more co-monomers, preferably up to 4.0 wt % of one or more co-monomers. It is preferred that it comprises at least 1.0 wt % of one or more co-monomers. For the purposes of the present invention the comonomer content of the random copolymer is given relative to the total weight of the random copolymer. Preferably the one or more co-monomer is ethylene. The co-monomer content can be measured by $^{13}$C NMR. The ethylene content can be measured by $^{13}$C NMR, for example by the method described in the example section below.

Polypropylene A can be produced by polymerizing propylene and one or more co-monomers, such as ethylene, in the presence of a catalyst system and optionally in the presence of hydrogen.

As used herein, the term "catalyst" refers to a substance that causes a change in the rate of a polymerization reaction. In the present invention, it is especially applicable to catalysts suitable for the polymerization of propylene to polypropylene. In some embodiments, the catalyst can be a Ziegler-Natta or a metallocene catalyst system.

In some preferred embodiments, polypropylene A is prepared using a Ziegler-Natta catalyst system.

In some embodiments, the Ziegler-Natta catalyst system comprises a titanium compound having at least one titanium-halogen bond and an internal electron donor, both on a suitable support (for example on a magnesium halide in active form), an organoaluminium compound (such as an aluminium trialkyl), and an optional external donor (such as a silane or a diether compound).

The internal donor can be selected from the group consisting of diether compounds, succinate compounds, phthalate compounds, di-ketone compounds, enamino-imine compounds and any blend of these. A mixture of internal donors can for example comprise a succinate and a phthalate or a succinate and a diether. Diether compounds are most preferred as internal donor. Ziegler-Natta catalysts comprising a diether, a succinate, a phthalate, a di-ketone or an enamino-imine as internal donor can for example be obtained by reaction of an anhydrous magnesium halide with an alcohol, followed by titanation with a titanium halide and reaction with the respective diether, succinate, phthalate, di-ketone or enamino-imine compound as internal donor.

Suitable diethers are 1,3-diethers of formula: $R^1R^2C(CH_2OR^3)(CH_2OR^4)$, wherein $R^1$ and $R^2$ are the same or different and are $C_1$-$C_{18}$ alkyl, $C_3$-$C_{18}$ cycloalkyl or $C_6$-$C_{18}$ aryl; $R^3$ and $R^4$ are the same or different and are $C_1$-$C_4$ alkyl radicals; or are the 1,3-diethers in which the carbon atom in position 2 belongs to a cyclic or polycyclic structure made up of 5, 6 or 7 carbon atoms and containing two or three unsaturations. Representative examples of said diethers are 2-methyl-2-isopropyl-1,3-dimethoxypropane; 2,2-diisobutyl-1,3-dimethoxypropane; 2-isopropyl-2-cyclopentyl-1,3-dimethoxypropane; 2-isopropyl-2-isoamyl-1,3-dimethoxypropane; 9,9-bis(methoxymethyl)fluorene.

Suitable succinate compounds have the formula

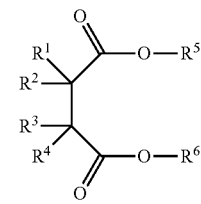

wherein $R^1$ to $R^4$ are equal to or different from one another and are hydrogen, or a $C_1$-$C_{20}$ linear or branched alkyl, $C_2$-$C_{20}$ alkenyl, $C_3$-$C_{20}$ cycloalkyl, $C_6$-$C_{20}$ aryl, $C_6$-$C_{20}$ aryl$C_1$-$C_{20}$ alkyl or $C_1$-$C_{20}$ alkyl$C_6$-$C_{20}$ aryl group, optionally containing heteroatoms, and $R^1$ to $R^4$, being joined to the same carbon atom, can be linked together to form a cycle; and $R^5$ and $R^6$ are equal to or different from one another and are a linear or branched $C_1$-$C_{20}$ linear or branched alkyl, $C_2$-$C_{20}$ alkenyl, $C_3$-$C_{20}$ cycloalkyl, $C_6$-$C_{20}$ aryl, $C_6$-$C_{20}$ aryl$C_1$-$C_{20}$ alkyl or $C_1$-$C_{20}$ alkyl$C_6$-$C_{20}$ aryl group, optionally containing heteroatoms.

Suitable phthalates are selected from the alkyl, cycloalkyl and aryl phthalates, such as for example diethyl phthalate, diisobutyl phthalate, di-n-butyl phthalate, dioctyl phthalate, diphenyl phthalate and benzylbutyl phthalate.

Suitable di-ketones are 1,3-di-ketones of formula

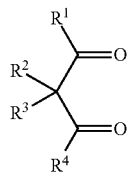

wherein $R^2$ and $R^3$ are equal to or different from one another and are hydrogen, or a $C_1$-$C_{20}$ linear or branched alkyl, $C_2$-$C_{20}$ alkenyl, $C_3$-$C_{20}$ cycloalkyl, $C_6$-$C_{20}$ aryl, $C_6$-$C_{20}$aryl$C_1$-$C_{20}$alkyl or $C_1$-$C_{20}$alkyl$C_6$-$C_{20}$aryl group, optionally containing heteroatoms, and $R^2$ and $R^3$, being joined to the same carbon atom, can be linked together to form a cycle; and $R^1$ and $R^4$ are equal to or different from one another and are a linear or branched $C_1$-$C_{20}$ linear or branched alkyl, $C_2$-$C_{20}$alkenyl, $C_3$-$C_{20}$ cycloalkyl, $C_6$-$C_{20}$aryl, $C_6$-$C_{20}$aryl$C_1$-$C_{20}$alkyl or $C_1$-$C_{20}$alkyl$C_6$-$C_{20}$aryl group, optionally containing heteroatoms.

Suitable enamino-imines have the general formula

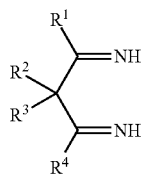

wherein $R^2$ and $R^3$ are equal to or different from one another and are hydrogen, or a $C_1$-$C_{20}$ linear or branched alkyl, $C_2$-$C_{20}$alkenyl, $C_3$-$C_{20}$ cycloalkyl, $C_6$-$C_{20}$aryl, $C_6$-$C_{20}$aryl$C_1$-$C_{20}$alkyl or $C_1$-$C_{20}$alkyl$C_6$-$C_{20}$aryl group, optionally containing heteroatoms, and $R^2$ and $R^3$, being joined to the same carbon atom, can be linked together to form a cycle; and $R^1$ and $R^4$ are equal to or different from one another and are a linear or branched $C_1$-$C_{20}$ linear or branched alkyl, $C_2$-$C_{20}$alkenyl, $C_3$-$C_{20}$ cycloalkyl, $C_6$-$C_{20}$aryl, $C_6$-$C_{20}$aryl$C_1$-$C_{20}$alkyl or $C_1$-$C_{20}$alkyl$C_6$-$C_{20}$aryl group, optionally containing heteroatoms.

The external electron donor (ED) is optional. Suitable external electron donors (ED) include certain silanes, ethers, esters, amines, ketones, heterocyclic compounds and blends of these. Preferably, 1,3-diether as described above or a silane can be used.

The organoaluminium compound is advantageously an Al-alkyl compound of the Al-trialkyls family, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups. Triethyl aluminium is preferred.

In some embodiments, polypropylene A is prepared using a metallocene catalyst system. The term "metallocene catalysts" refers to compounds of Group IV transition metals of the Periodic Table such as titanium, zirconium, hafnium, etc., which have a coordinated structure with a metal compound and ligands composed of one or two groups of cyclopentadienyl, indenyl, fluorenyl or their derivatives. In some preferred embodiments, the metallocene catalyst system comprises a bridged metallocene component, a support and an activating agent.

In some embodiments, the metallocene component is a metallocene of the following general formula: $(\mu\text{-}R^a)(R^b)(R^c)MX_1X_2$, wherein $\mu$, $R^a$, $R^b$, $R^c$, M, $X_1$, $X_2$ have the meaning given herein. $R^a$ is a bridge between $R^b$ and $R^c$, i.e. $R^a$ is chemically connected to $R^b$ and $R^c$. In a preferred embodiment, $R^a$ is selected from the group consisting of —$(CR^1R^2)_p$—, —$(SiR^1R^2)_p$—, —$(GeR^1R^2)_p$—, —$(NR^1)_p$—, —$(PR^1)_p$—, —$(N^+R^1R^2)_p$— and —$(P^+R^1R^2)_p$—, and p is 1 or 2, and $R^1$ and $R^2$ are each independently selected from the group consisting of hydrogen, $C_1$-$C_{10}$alkyl, $C_5$-$C_8$cycloalkyl, $C_6$-$C_{15}$aryl, $C_{1-10}$alkyl$C_{6-15}$ aryl, or any two neighboring R (i.e. two neighboring $R^1$, two neighboring $R^2$, or $R^1$ with a neighboring $R^2$) may form a cyclic saturated or non-saturated $C_4$-$C_{10}$ ring; each $R^1$ and $R^2$ may in turn be substituted in the same way. Preferably $R^a$ is —$(CR^1R^2)_p$— or —$(SiR^1R^2)_p$— with $R^1$, $R^2$ and p as defined above. Most preferably $R^a$ is —$(SiR^1R^2)_p$— with $R^1$, $R^2$ and p as defined above. Specific examples of $R^a$ include $Me_2C$, ethanediyl (—$CH_2$—$CH_2$—), $Ph_2C$ and $Me_2Si$. M is a metal selected from Ti, Zr and Hf, preferably it is Zr. $X^1$ and $X^2$ are each independently selected from the group consisting of halogen, hydrogen, $C_1$-$C_{10}$alkyl, $C_6$-$C_{15}$aryl, $C_{1-10}$alkyl$C_{6-15}$aryl. Preferably $X^1$ and $X^2$ are halogen or methyl. $R^b$ and $R^c$ are selected independently from one another and comprise a cyclopentadienyl ring. Preferred examples of halogen are Cl, Br, and I. Preferred examples of $C_1$-$C_{10}$alkyl are methyl, ethyl, n-propyl, iso-propyl, n-butyl, iso-butyl, and tert-butyl. Preferred examples of $C_5$-$C_7$cycloalkyl are cyclopentyl, cyclohexyl, cycloheptyl and cyclooctyl. Preferred examples of $C_6$-$C_{15}$aryl are phenyl and indenyl. Preferred examples of alkylaryl with $C_1$-$C_{10}$alkyl and $C_6$-$C_{15}$aryl are benzyl (—$CH_2$-Ph), and —$(CH_2)_2$-Ph. In some preferred embodiments, $R^b$ and $R^c$ are both substituted cyclopentadienyl, or are independently from one another unsubstituted or substituted indenyl or tetrahydroindenyl, or $R^b$ is a substituted cyclopentadienyl and $R^c$ a substituted or unsubstituted fluorenyl. More preferably, $R^b$ and $R^c$ may both be the same and may be selected from the group consisting of substituted cyclopentadienyl, unsubstituted indenyl, substituted indenyl, unsubstituted tetrahydroindenyl and substituted tetrahydroindenyl. By "unsubstituted" is meant that all positions on $R^b$ resp. $R^c$, except for the one to which the bridge is attached, are occupied by hydrogen. By "substituted" is meant that, in addition to the position at which the bridge is attached, at least one other position on $R^b$ and/or $R^c$ is occupied by a substituent other than hydrogen, wherein each of the substituents may independently be selected from the group consisting of $C_1$-$C_{10}$alkyl, $C_5$-$C_7$cycloalkyl, $C_6$-$C_{15}$aryl, and $C_{1-10}$alkyl$C_{6-15}$aryl, or any two neighboring substituents may form a cyclic saturated or non-saturated $C_4$-$C_{10}$ ring. A substituted cyclopentadienyl may for example be represented by the general formula $C_5R^3R^4R^5R^6$. A substituted indenyl may for example be represented by the general formula $C_9R^7R^8R^9R^{10}R^{11}R^{12}R^{13}R^{14}$. A substituted tetrahydroindenyl may for example be represented by the general formula $C_9H_4R^{15}R^{16}R^{17}R^{18}$. A substituted fluorenyl may for example be represented by the general formula $C_{13}R^{19}R^{20}R^{21}R^{22}R^{23}R^{24}R^{25}R^{26}$. Each of the substituents $R^3$ to $R^{26}$ may independently be selected from the group consisting of hydrogen, $C_1$-$C_{10}$alkyl, $C_5$-$C_7$cycloalkyl, $C_6$-$C_{16}$aryl, and $C_{1-10}$alkyl$C_{6-15}$aryl, or any two neighboring R may form a cyclic saturated or non-saturated $C_4$-$C_{10}$ ring; provided, however, that not all substituents simultaneously are hydrogen. Preferred metallocene components are those having $C_2$-symmetry or those having $C_1$-symmetry. Most preferred are those having $C_2$-symmetry. Particularly suitable metallocene components are those wherein $R^b$ and $R^c$ are the same and are substituted cyclopentadienyl, preferably wherein the cyclopentadienyl is substituted in the 2-position, the 3-position, or simultaneously the 2-position and the 3-position. Particularly suitable metallocene components are also those wherein $R^b$ and $R^c$ are the same and are selected from the group consisting of unsubstituted indenyl, unsubstituted tetrahydroindenyl, substituted indenyl and substituted tetrahydroindenyl. Particularly suitable metallocene components may also be those wherein $R^b$ is a substituted cyclopentadienyl and $R^b$ is a substituted or unsubstituted fluorenyl.

The metallocene catalyst may be supported according to any method known in the art. The support can be any organic or inorganic solid, particularly porous supports. Preferably, the support material is an inorganic oxide in its finely divided form. Suitable support materials include solid inorganic oxides, such as silica, alumina, magnesium oxide, titanium oxide, boron trioxide, calcium oxide, zinc oxide, barium oxide, thorium oxide, as well as mixed oxides of silica and one or more Group 2 or 13 metal oxides, such as silica-magnesia and silica-alumina mixed oxides.

Silica, alumina, and mixed oxides of silica and one or more Group 2 or 13 metal oxides are preferred support materials. Preferred examples of such mixed oxides are the silica-aluminas. Most preferred is a silica compound. In a preferred embodiment, the metallocene catalyst is provided on a solid support, preferably a silica support. The silica may be in granular, agglomerated, fumed or other form.

In some embodiments, alumoxane is used as an activating agent for the metallocene catalyst. As used herein, the term "alumoxane" and "aluminoxane" are used interchangeably, and refer to a substance, which is capable of activating the metallocene catalyst. In an embodiment, alumoxanes comprise oligomeric linear and/or cyclic alkyl alumoxanes. In a further embodiment, the alumoxane has formula (V) or (VI)

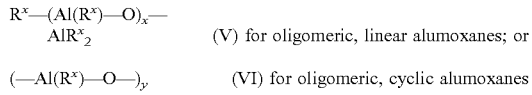

$R^x$—(Al($R^x$)—O)$_x$—
AlR$^x_2$      (V) for oligomeric, linear alumoxanes; or (—Al($R^x$)—O—)$_y$      (VI) for oligomeric, cyclic alumoxanes wherein x is 1-40, and preferably 10-20; wherein y is 3-40, and preferably 3-20; and wherein each $R^x$ is independently selected from a $C_1$-$C_8$alkyl, and preferably is methyl. In a preferred embodiment, the alumoxane is methylalumoxane (MAO).

The polymerization of propylene can for example be carried out in liquid propylene as reaction medium (bulk polymerization). It can also be carried out in diluents, such as hydrocarbon that is inert under polymerization condition (slurry polymerization). It can also be carried out in the gas phase. Those processes are well known to one skilled in the art.

In some preferred embodiments, the melt flow index of polypropylene A is at least 10.0 g/10 min, preferably at least 15.0 g/10 min, preferably at least 20 g/10 min, preferably at least 25 g/10 min, preferably at least 30 g/10 min, preferably at least 35 g/10 min, for example at least 40 g/10 min.

In some preferred embodiments, polypropylene B is a propylene homopolymer. In some preferred embodiments, polypropylene B comprises at most 0.2% of co-monomer, preferably at most 0.1 of co-monomer, preferably at most 0.05% of co-monomer, preferably at most 0.02% of co-monomer, preferably at most 0.01% of co-monomer. The co-monomer content herein is measured by $^{13}$C NMR. In some preferred embodiments, polypropylene B comprises at most 0.2 of ethylene, preferably at most 0.1% of ethylene, preferably at most 0.05% of ethylene, preferably at most 0.02% of ethylene, preferably at most 0.01% of ethylene. The ethylene content herein is measured by $^{13}$C NMR.

The polypropylene B can be produced by polymerizing propylene and optionally hydrogen, in the presence of a catalyst system. In some embodiments, the catalyst can be a Ziegler-Natta or a metallocene catalyst system. In some preferred embodiments, polypropylene B is prepared using a Ziegler-Natta catalyst system.

The melt flow index of polypropylene B is at most 1.0 g/10 min. In some preferred embodiments, the melt flow index of polypropylene B is at most 0.9 g/10 min, preferably at most 0.8 g/10 min, preferably at most 0.7 g/10 min, preferably at most 0.6 g/10 min, preferably at most 0.5 g/10 min, preferably at most 0.4 g/10 min, for example at most 0.3 g/10 min.

In some preferred embodiments, the melt flow index of the polypropylene composition is at least 1.0 g/10 min, for example at least 2.0 g/10 min, for example at least 5.0 g/10 min. In some preferred embodiments, the melt flow index of the polypropylene composition is at most 30 g/10 min, for example at most 25 g/10 min, for example at most 20 g/10 min. In some preferred embodiments, the melt flow index of the polypropylene composition is at least 1.0 g/10 min and at most 30 g/10 min, for example at least 2.0 g/10 min and at most 25 g/10 min, for example at least 5.0 g/10 min and at most 20 g/10 min.

The ratio of the melt flow index of polypropylene A to the melt flow index of polypropylene B is at least 20. As used herein, the term "ratio of X to Y" refers to the value of X divided by Y, whereby X and Y are expressed in the same units of measurement. In some preferred embodiments, the ratio of the melt flow index of polypropylene A to the melt flow index of polypropylene B is at least 30, preferably at least 40, preferably at least 50, preferably at least 60, preferably at least 70, preferably at least 80, preferably at least 90, preferably at least 100, preferably at least 110, preferably at least 120, for example at least 130.

Polypropylene A can be produced in a single, double or multiple polymerization reactor. Polypropylene B can be separately produced in a single, double, or multiple polymerization reactor, and then both polypropylenes can be blended together.

Alternatively, the polypropylene composition can be produced in at least two sequential polymerization reactors, operating under different conditions, wherein a first polypropylene is produced in the first reactor, and a second polypropylene is produced in the second reactor in the presence of the first polypropylene, and wherein the hydrogen concentration in at least one of the polymerization reactors is controlled such as to produce therein the propylene polymer with the lowest melt flow index as defined above, so as to produce the polypropylene composition of the invention. Preferably, the first polypropylene is polypropylene B, and the second polypropylene is polypropylene A.

The polypropylene composition comprises at least 50% by weight to at most 90% by weight of polypropylene A, and at least 10% by weight to at most 50% by weight of polypropylene B, with by weight based on the total weight of the polypropylene composition. Preferably, the polypropylene composition comprises at least 50% by weight to at most 90% by weight of polypropylene random copolymer, and at least 10% by weight to at most 50% by weight of polypropylene homopolymer, with % by weight based on the total weight of the polypropylene composition. In some preferred embodiments, the polypropylene composition comprises at least 50% by weight to at most 85% by weight of polypropylene random copolymer, and at least 15% by weight to at most 50% by weight of polypropylene homopolymer; preferably wherein the polypropylene composition comprises at least 60% by weight to at most 90% by weight of polypropylene random copolymer, and at least 10% by weight to at most 40% by weight of polypropylene homopolymer; preferably wherein the polypropylene composition comprises at least 60% by weight to at most 85% by weight of polypropylene random copolymer, and at least 15% by weight to at most 40% by weight of polypropylene homopolymer; preferably wherein the polypropylene composition comprises at least 70% by weight to at most 85% by weight of polypropylene random copolymer, and 15% by weight to at most 30% by weight of polypropylene homopolymer; preferably wherein the polypropylene composition comprises at least 75% by weight to at most 85% by weight of polypropylene random copolymer, and 15% by weight to at most 25% by weight of polypropylene homopolymer.

In some preferred embodiments, the difference between the melting point as measured according to ISO 3146 of polypropylene homopolymer and the melting point as measured according to ISO 3146 of polypropylene random copolymer is at least 9.0° C., preferably at least 10.0° C., preferably at least 11.0° C., preferably at least 12.0° C., preferably at least 13.0° C., preferably at least 14.0° C., preferably at least 15.0° C.

In some embodiments, the polypropylene composition comprises one or more additives. The additives are such as for example antioxidants, light stabilizers, acid scavengers, lubricants, antistatic agents, fillers, nucleating agents, clarifying agents, colorants. An overview of useful additives is given in Plastics Additives Handbook, ed. H. Zweifel, 5$^{th}$ edition, Hanser Publishers.

Preferably, the polypropylene composition may comprise one or more nucleating agents.

In some embodiments, the polypropylene used herein comprises a nucleating agent. For the purposes of the present application a nucleating agent is defined as a chemical compound that raises the crystallization temperature of the polypropylene. Suitable nucleating agents for use in the present invention can be selected from any of the nucleating agents known to the skilled person. In an embodiment, the nucleating agent is an alpha-nucleating agent. In some embodiments, alpha-nucleating agent is selected from the group comprising talc, carboxylate salts, sorbitol acetals, phosphate ester salts, substituted benzene tricarboxamides and polymeric nucleating agents, as well as blends thereof.

Examples of suitable carboxylate salts include organocarboxylic acid salts. Particular examples are sodium benzoate and lithium benzoate. The organocarboxylic acid salts may also be alicyclic organocarboxylic acid salts, such as bicyclic organodicarboxylic acid salts and in particular bicyclo [2.2.1]heptane dicarboxylic acid salt. A nucleating agent of this type is sold as HYPERFORM® HPN-68 by Milliken Chemical. Examples of suitable sorbitol acetals include dibenzylidene sorbitol (DBS), bis(p-methyl-dibenzylidene sorbitol) (MDBS), bis(p-ethyl-dibenzylidene sorbitol), bis (3,4-dimethyl-dibenzylidene sorbitol) (DMDBS), and bis(4-propylbenzylidene) propyl sorbitol. Bis(3,4-dimethyl-dibenzylidene sorbitol) (DMDBS) and bis(4-propylbenzyhdene) propyl sorbitol are preferred. These can for example be obtained from Milliken Chemical under the trade names of Millad 3905, Millad 3940, Millad 3988 and Millad NX8000. Examples of suitable phosphate ester salts include salts of 2,2'-methylene-bis-(4,6-di-tert-butylphenyl)phosphate.

Such phosphate ester salts are for example available as NA-1 1 or NA-21 from Asahi Denka. Examples of suitable substituted tricarboxamides include compounds of general formula (I):

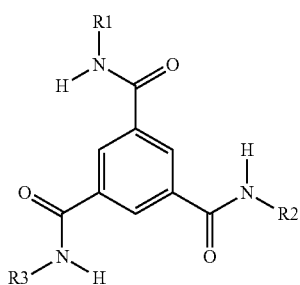

(I)

wherein R1, R2 and R3, independently of one another, are selected from $C_1$-$C_{20}$ alkyl, $C_5$-$C_{12}$ cycloalkyl, or phenyl, each of which may in turn be substituted with one or more $C_1$-$C_{20}$ alkyl, $C_5$-$C_{12}$ cycloalkyl, phenyl, hydroxyl, $C_1$-$C_{20}$ alkylamino or $C_1$-$C_{20}$ alkyloxy etc. Examples of $C_1$-$C_{20}$ alkyl include methyl, ethyl, n-propyl, n-butyl, iso-butyl, tert-butyl, n-pentyl, iso-pentyl, 1,1-dimethylpropyl, 1,2-dimethylpropyl, 3-methylbutyl, hexyl, heptyl, octyl or 1,1,3, 3-tetramethylbutyl. Examples of $C_5$-$C_{12}$ cycloalkyl include cyclopentyl, cyclohexyl, cyclooctyl, cyclododecyl, adamantyl, 2-methylcyclohexyl, 3-methylcyclohexyl or 2,3-dimethylcyclohexyl. Such nucleating agents are disclosed in WO 03/102069 and by Blomenhofer et al. in Macromolecules 2005, 38, 3688-3695. Non-limiting examples of polymeric nucleating agents include polymeric nucleating agents containing vinyl compounds, such as for example those disclosed in EP-A1-0152701 and EP-A2-0368577. Polymeric nucleating agents containing vinyl compounds can either be physically or chemically blended with the polypropylene. Suitable vinyl compounds include vinyl cycloalkanes or vinyl cycloalkenes having at least 6 carbon atoms, such as for example vinyl cyclopentane, vinyl-3-methyl cyclopentane, vinyl cyclohexane, vinyl-2-methyl cyclohexane, vinyl-3-methyl cyclohexane, vinyl norbornane, vinyl cyclopentene, vinyl cyclohexene, vinyl-2-methyl cyclohexene. Further examples of polymeric nucleating agents include poly-3-methyl-1-butene, polydimethylstyrene, polysilanes and polyalkylxylenes. These polymeric nucleating agents can be introduced into the polypropylene either by chemical or by physical blending.

Beta nucleating agents useful in embodiments disclosed herein induce the formation of beta-crystals in polypropylene, and may include various organic and inorganic nucleating agents, such as: the gamma-crystalline form of a quinacridone colorant Permanent Red E3B "Q-Dye;" the bisodium salt of o-phthalic acid; the aluminum salt of 6-quinizarin sulfonic acid; isophthalic and terephthalic acids; nucleating agents based upon salts of rosin/adiebetic acid; zinc (II) monoglycerolate; nucleating agents based upon diamide compounds as disclosed in U.S. Pat. No. 6,235,823, for example; nucleating agents based upon trimesic acid derivatives, such as disclosed in WO 02/46300, WO 03/102069, WO 2004/072168, including, for example, 1,3,5-benzenetricarboxylic acid tris(cyclopentylamide), 1,3, 5-benzenetricarboxylic acid tris(cyclohexylamide), and 1,3, 5-benzenetricarboxylic acid tris(tert-butyl)amide. Beta nucleating agents as described in JP 8144122, JP 7033895, CN 1568845 and JPI 1140719 may also be used. Other suitable beta nucleating agents are disclosed in DE 3,610, 644, prepared from two components, (A) an organic dibasic acid, such as pimelic acid, azelaic acid, o-phthalic acid, terephthalic acid, and isophthalic acid; and (B) an oxide, hydroxide or an acid salt of a metal of Group II, such as magnesium, calcium, strontium, and barium. The acid salt of the second component (B) may be derived from an organic or inorganic acid, such as a carbonate or a stearate.

The nucleating agents may be used in the form of powders, pellets, liquids, other commonly available forms, or combinations thereof, for admixture (melt blending) with polypropylenes. In other embodiments, the nucleating agent may be compounded with a polypropylene to form a nucleating additive master batch for admixture (melt blending) with polypropylenes. Compositions including polypropylene(s) and nucleating agent(s) according to embodiments disclosed herein may be prepared by mixing or kneading the respective components at a temperature around or above the melting point temperature of one or more of the blend components. Typical polymer mixing or kneading equipment that is capable of reaching the desired temperatures and melt plastifying the mixture may be employed. These include mills, kneaders, extruders (both single screw and twin-screw), BANBURY® mixers, calenders, and the like. The sequence of mixing and methods may depend on the final composition as well as the form of the starting components (powder, pellet, masterbatch, etc.).

The invention also encompasses a process for preparing a polypropylene composition. The process comprises the steps of:
i) providing a polypropylene A;
ii) providing a polypropylene B, wherein the melt flow index of polypropylene B is at most 1.0 g/10 min, and wherein the ratio of the melt flow index of polypropylene A to the melt flow index of polypropylene B is at least 20;
iii) blending at least 50% by weight to at most 90% by weight of polypropylene A, with at least 10% by weight to at most 50% by weight of polypropylene B, with % by weight based on the total weight of the composition, into a polypropylene composition.

In some embodiments, the process comprises the steps of: blending at least 50% by weight to at most 90% by weight of polypropylene random copolymer, with at least 10% by weight to at most 50% by weight of polypropylene homopolymer, with % by weight based on the total weight of the composition, into a polypropylene composition, wherein the melt flow index of said polypropylene homopolymer is at most 1.0 g/10 min, and wherein the ratio of the melt flow index of said polypropylene random copolymer to the melt flow index of said polypropylene homopolymer is at least 20.

The polypropylene composition can be obtained by chemically or physically blending said at least two polypropylenes A and B, preferably by physically blending, preferably by melt blending said at least two polypropylenes A and B. In some preferred embodiments, the two polypropylenes A and B are blended in fluff form, powder form, or pellet form, preferably in pellet form.

As used herein, the term "melt blending" involves the use of shear force, extensional force, compressive force, ultrasonic energy, electromagnetic energy, thermal energy or combinations comprising at least one of the foregoing forces or forms of energy and is conducted in processing equipment wherein the aforementioned forces are exerted by a single screw, multiple screws, intermeshing co-rotating or counter rotating screws, non-intermeshing co-rotating or counter rotating screws, reciprocating screws, screws with pins, barrels with pins, rolls, rams, helical rotors, or combinations comprising at least one of the foregoing. Melt blending may be conducted in machines such as, single or multiple screw extruders, Buss kneader, Eirich mixers, Henschel, helicones, Ross mixer, Banbury, roll mills, molding machines such as injection molding machines, vacuum forming machines, blow molding machines, or the like, or combinations comprising at least one of the foregoing machines. In a preferred embodiment, melt blending is performed in a twin screw extruder.

The invention also encompasses an article comprising the polypropylene composition according to the first aspect of the invention. Preferred embodiments for the first or second aspect of the invention are also preferred embodiments for the article of the invention.

In some embodiments, the article comprises one or more layers, for example one or more layers of the polypropylene composition, for example at least one layer. In some preferred embodiments, the article comprises at least one polypropylene layer, preferably made of the polypropylene composition according to the first aspect of the invention. The invention also encompasses sheets and thermoformed articles comprising a polypropylene layer made of a polypropylene composition according to the first aspect of the invention. The present invention further relates to a process for producing such sheets and thermoformed articles.

In some preferred embodiments, the article is a thermoformed article. Preferably, the article is a container, for example a container for food or feed, drinking cups etc. In some embodiments, the article is a household appliance. In some preferred embodiments, the household appliance is a refrigerator or refrigerator component, or a freezer or freezer component. A refrigerator component or a freezer component may be selected from the list comprising: grid, shelf, door shelf, bin, or door bin. The polypropylene composition of the invention may show excellent environmental stress crack resistance (ESCR) at low temperatures, rendering it suitable for frozen packaging while retaining good mechanical properties.

The invention also encompasses a process for preparing an article comprising the polypropylene composition according to the first aspect of the invention. Preferred embodiments for the first, second, or third aspect of the invention are also preferred embodiments for the present process.

The polypropylene composition herein is particularly suited for the production of thermoformed articles. Examples of such articles are food storage containers.

In some preferred embodiments, the process for preparing an article comprises the steps of:
a) providing a polypropylene composition according to the first aspect of the invention, or preferred embodiments thereof;
b) forming a sheet or plate with the polypropylene composition of step a);
c) thermoforming the sheet or plate formed in step b) into an article according to the third aspect of the invention, or preferred embodiments thereof.

Thermoformed articles can be generally produced by a two-stage process, wherein in the first stage a sheet is produced by melt-extruding a polymer (melt-extrusion stage), and in the second stage said sheet is shaped (thermoforming stage). The two stages may either directly follow each other (in-line thermoforming) or they may not directly follow each other, in which case the produced sheet is stored for some time (e.g. a few hours, days or months) first and only later fed to the thermoforming stage.

The sheet formed in step b) of the process for preparing an article may be produced on any melt extrusion sheet line, the sheet production process for example comprising the steps of:
(1) providing a polypropylene composition to an extruder;
(2) subsequently melting the polypropylene composition in the extruder to obtain a molten polypropylene composition;
(3) melt-extruding the molten polypropylene composition obtained in step (2) through a slit die to form an extrudate; and
(4) cooling the extrudate to obtain a sheet.

The invention also encompasses an extruded sheet or plate formed from the polypropylene composition according to the first aspect of the invention.

The sheet obtained in step (4) of the sheet production process, is preferably obtained by extrusion through a flat die with cooling calender before being wound into a coil. The thickness distribution of the sheet is preferably controlled during production. The extrusion conditions are preferably optimized to avoid excessive shrinkage and allow distribution of uniform thickness. In some preferred embodiments, the sheet formed in step b) of the process for preparing an article, or step (4) of the sheet production process, has a thickness of at least 0.2 mm and at most 2.0 mm. In some preferred embodiments, the plate formed in step b) of the process for preparing an article has a thickness of at most 25 mm.

Step c) of the process for preparing an article comprises thermoforming the sheet or plate into an article. Thermoforming is one of the major methods of processing thermoplastic polymers to achieve, from calendered or extruded sheets, objects of widely varying thicknesses and very high production rate dimensions. The thermoforming stage (c) of the process for preparing an article can be performed on any thermoforming machine comprising a heating and a forming section.

In some preferred embodiments, the thermoforming stage (c) of the process for preparing an article comprises a first heating step, whereby the sheet or plate is heated to a temperature allowing its shaping. In some preferred embodiments, the thermoforming stage (c) of the process for preparing an article comprises a second shaping step, whereby the heated sheet or plate is shaped into a mold. In some preferred embodiments, the thermoforming stage (c) of the process for preparing an article comprises a third cooling step, after which the desired object is obtained. Preferably, the thermoforming stage (c) comprises a first heating step, a second shaping step, and a third cooling step.

Preferably, the thermoforming stage (c) of the process for preparing an article comprises the steps of:
(5) draping the sheet, preferably which is at a temperature at which it is soft, over or into a mold, thus obtaining a formed sheet;
(6) cooling the formed sheet to a temperature at which it maintains its shape; and
(7) removing the thermoformed sheet from the mold.

Optionally, the thermoforming stage (c) of the process for preparing an article may further comprise a step of warming the sheet to a temperature at which it is soft before it is draped. Such an optional step of warming the sheet may particularly be required when sheet production and thermoforming are done "off-line", i.e. not in series, and/or the sheet is stored for some time to allow it to cool to a temperature below the temperature at which it can be draped. Thus, the thermoforming stage (c) of the process for preparing an article may comprise a step of:
(4a) warming the sheet obtained in step (4) of the sheet production process to a temperature at which it is soft, to obtain a soft sheet, which is then used in the draping step (5).

The present invention encompasses thermoforming of packaging, such as containers. The process can be done using in-line thermoforming, which is a processing technology whereby a thermoforming unit is placed right behind an extrusion line, to turn polymer pellets into finished product in one operation.

The process can be done using a Form-Fill-and-Seal (FFS) line comprises an unwinding station which feeds a standard thermoforming station: heaters raise the temperature of a sheet so that it can be formed with the aid of a punch, for example into the shape of one or more containers. These sheets have been previously prepared. The containers may then advance to a filling station which discharges the product into the containers. A lid may subsequently be provided over the containers to seal them. The containers may then be cut into 8 groups of 4 or individual portions fastened together. This type of thermoforming packaging allows the realization of a multipack. The advantage of this route is that the containers do not need to be sterilized as they are filled in a controlled environment to ensure the sterility of the entire environment.

In some preferred embodiments, stage (c) of the process for preparing an article is performed in an FFS line.

Optionally, the thermoforming stage (c) of the process for preparing an article may comprise a trimming step. Trimming is usually defined as the process of mechanical breaking the thermoformed sheet into two pieces, one of which is the desired thermoformed article, the other being the edge trim. Thus, the process as defined optionally comprises the step of: 9) trimming the theremoformed sheet obtained in step 7) to obtain a thermoformed article.

The present application also encompasses the use of a polypropylene composition as defined herein in the production of a sheet or thermoformed article.

The present inventors have noted with surprise that the use of the polypropylene composition of the present invention allows broadening of the processing window in the thermoforming stage as compared to prior art polypropylene, such as a polypropylene homopolymer. Hence, the polypropylene composition of the present invention allows for easier processing in the forming step. At the same time the polypropylene polymer of the present invention has mechanical properties that are comparable to those of a prior art polypropylene homopolymer.

In consequence, the present invention also discloses the use of the polypropylene composition as defined above in thermoforming. The present inventors have noted with surprise that the use of the polypropylene composition of the present invention provided thermoformed articles having also good wall thickness distribution.

The present inventors have also noted that the use of the polypropylene composition improved the productivity by a least 5%, preferably by at least 10%. It was indeed possible to produce more thermoformed articles (such as cups) per minutes compared to prior art composition. The production rates were therefore improved.

The following examples serve to merely illustrate the invention and should not be construed as limiting its scope in any way. While the invention has been shown in only some of its forms, it should be apparent to those skilled in the art that it is not so limited, but is susceptible to various changes and modifications without departing from the scope of the invention.

EXAMPLES

Test Methods:

The density was measured according to the method of standard ISO 1183 at a temperature of 23° C.

The melt flow index (MFI) of the polypropylene or of the composition was measured according to the method of standard ISO 1133, condition M, at 230° C. and under a load of 2.16 kg.

The total ethylene content (wt % $C_2$) relative to the total weight of the propylene polymer and the molar fraction of ethylene co-monomer in sequences of length one relative to the co-monomer content are determined by $^{13}C$ NMR analysis according to the state of the art of $^{13}C$ NMR analysis of propylene based polyolefins.

The $^{13}C$ NMR analysis was performed under conditions such that the signal intensity in the spectrum is directly proportional to the total number of contributing carbon atoms in the sample. Such conditions are well known to the skilled person and include for example sufficient relaxation time etc. In practice, the intensity of a signal is obtained from its integral, i.e. the corresponding area. The data were acquired using proton decoupling, several hundred even thousands scans per spectrum, at a temperature of 130° C. The sample was prepared by dissolving a sufficient amount of polymer in 1,2,4-trichlorobenzene (TCB 99% spectroscopic grade) at 130° C. and occasional agitation to homogenize the sample, followed by the addition of hexadeuterobenzene (C6D6, spectroscopic grade) and a minor amount of hexamethyldisiloxane (HMDS, 99.5+%), with HMDS serving as internal standard. To give an example, about 200 to 600 mg of polymer were dissolved in 2.0 ml of TCB, followed by addition of 0.5 ml of $C_6D6$ and 2 to 3 drops of HMDS. The chemical shifts are referenced to the signal of the internal standard HMDS, which is assigned a value of 2.03 ppm.

NMR $^{13}$C observed signals are assigned according to the comonomer involved and corresponding literature. The following non-exhaustive literature references can be used: G. J. Ray et al. in Macromolecules, vol 10, n° 4, 1977, p. 773-778 and Y. D Zhang et al in Polymer Journal, vol 35, n° 7, 2003, p. 551-559.

The total ethylene content (wt % $C_2$) relative to the total weight of propylene polymer is determined from the appropriate peaks area combination, a well-known method to the skilled person.

For DSC (Differential Scanning calorimetry) tests, the following heating profile was used for polypropylene:
  Equilibrate at 40° C.
  Heat at 10° C./min to 220° C.
  Isothermal for 3 min
  Cool down at 10° C./min to 30° C.
  Isothermal for 2 min.

The compositions were blended and extruded in a Leistritz twin screw extruder comprising co-rotating screws, a screw diameter of 20 mm, screw length of 800 mm, L/D of 400 mm, a rotational speed of 80 revolutions/min, a standard screw module, and a capacity of 2 kg of material.

For the preparation of the sheets a COLLIN single screw extruder provided at the extruder outlet with a calendering system, was used. The resulting sheets had a thickness of about 1 mm (+/-3%). After extrusion, the sheets were coiled and stored at 23° C. for at least 24 hours.

The thermoforming window was determined as follows: sheets having a thickness of 1 mm were produced on a melt-extrusion line (as described herein above) and stored under ambient conditions. The sheet temperature was measured during the transfer of the heating station to the punching station by an infrared pyrometer and the punch was equipped with a force sensor. The sheet was then thermoformed by plug (punch)-assisted pressure forming on an ALM thermoforming machine into cups having a depth of 50 mm and an inner diameter of 85 mm at the top and 70 mm at the bottom with a rim of 5 mm at the top.

Initial oven settings for heating the sheet were chosen such that the sheet reaches a temperature at which it may just be thermoformed, and a total of 5 cups of the same mold were produced. The sheet temperature was then increased in increments of 1° C., whereby again a total of 5 cups of the same mold was produced at each temperature, until the sheet could no longer be thermoformed. The collected cups were then subjected to a dynamic compression test to determine the top load, the average of the top load of the 5 cups produced under identical conditions was taken and plotted against the respective sheet temperature. The plotted curve had a bell shape, i.e. the top load had a maximum. Said curve was then approximated by a $4^{th}$ degree polynomial equation of the general form $Y=a*X^4+b*X^3+c*X^2+d*X+e$, which in the following was used in the determination of the thermoforming window. The thermoforming window is defined as the range in sheet temperatures at which the top load is at least 80% of the maximum top load determined for the respective sheet.

Dynamic compression tests were performed on a Zwick/Roell measuring machine. The tests were carried out on the thermoformed cups at a rate of 10 mm/min with a load cell of 2500N. These cups were tested after seven days of aging and underwent conditioning in a controlled room at 23° C. with a humidity of 50%. A pre-load of 5N load was required to re-level the container before the start of the measurement.

Thickness measurements were made by applying or by moving a magnetic sensor on one side of the material to be inspected, while a small metal ball was placed on the opposite inside face of the cup. The integrated Hall effect sensor measured the distance between the end of the probe and the ball. Measurements are expressed in number of the measuring point from 1 to 8, as illustrated in FIG. 1. It allowed evaluating the thickness of the walls with a measurement performed according to four axes in the cup (0°, 90°, 180°, and 270°).

The following polymers were used in the examples.
PS: The polystyrene used was a blend of 70 wt % HIPS 7240 and 30 wt % GPPS 1540, with wt % based on the total weight of the polystyrene blend.
  HIPS 7240, commercially available from Total Refining & Chemicals as Polystyrene Impact 7240, is a very high impact polystyrene with an MI5 of 4.5 g/10 min, as measured according to ISO 1133H at 200° C. under a load of 5 kg, and a flexural modulus of 1850 MPa, as measured according to ISO 178.
  GPPS 1540, commercially available from Total Refining & Chemicals, is an easy flowing crystal polystyrene with an MI5 of 11 g/10 min, as measured according to ASTM D 1238 at 200° C. under a load of 5 kg, and a flexural modulus of 3000 MPa, as measured according to ASTM D 790.
PPR: PPR 3260, commercially available from Total Refining & Chemicals, is a random copolymer polypropylene with a density of 0.902 g/cm$^3$, as measured according to ISO 1183, a melt flow index of 1.8 g/10 min, as measured according to ISO 1133 at 230° C. under a load of 2.16 kg, a melting point of 148° C., as measured according to ISO 3146, and a flexural modulus of 1000 MPa, as measured according to ISO 178.
PPH1: PPH 4042, a Ziegler-Natta catalyzed polypropylene commercially available from Total Refining & Chemicals, is a nucleated polypropylene homopolymer with a density of 0.905 g/cm$^3$, as measured according to ISO 1183, a melt flow index of 3 g/10 min, as measured according to ISO 1133 at 230° C. under a load of 2.16 kg, a melting point of 165° C., as measured according to ISO 3146, and a flexural modulus of 1550 MPa, as measured according to ISO 178.
PPR1: PPR 10232, a Ziegler-Natta catalyzed polypropylene commercially available from Total Refining & Chemicals, is a nucleated and antistatic random copolymer polypropylene with a density of 0.902 g/cm$^3$, as measured according to ISO 1183, a melt flow index of 40 g/10 min, as measured according to ISO 1133 at 230° C. under a load of 2.16 kg, a melting point of 147° C., as measured according to ISO 3146, and a flexural modulus of 1150 MPa, as measured according to ISO 178, and comprising 3.0-3.5% of ethylene.

PPH2: PPH 3060, commercially available from Total Refining & Chemicals, is a polypropylene homopolymer with a density of 0.905 g/cm$^3$, as measured according to ISO 1183, a melt flow index of 1.8 g/10 min, as measured according to ISO 1133 at 230° C. under a load of 2.16 kg, a melting point of 165° C., as measured according to ISO 3146, and a flexural modulus of 1300 MPa, as measured according to ISO 178.

PPH3: PPH 1060, commercially available from Total Refining & Chemicals, is a polypropylene homopolymer with a density of 0.905 g/cm$^3$, as measured according to ISO 1183, a melt flow index of 0.3 g/10 min, as measured according to ISO 1133 at 230° C. under a load of 2.16 kg, a melting point of 165° C., as measured according to ISO 3146, and a flexural modulus of 1500 MPa, as measured according to ISO 178.

The compositions as shown in Table 1 were tested, whereby WI is the melt flow index and Tm is the melt temperature as measured by DSC at 10° C./min.

TABLE 1

| Compositions | content | MFI g/10 min | Tm ° C. |
|---|---|---|---|
| PS | 100 wt % PS | | |
| PPR | 100 wt % PPR | 1.8 | 145.12 |
| PPH1 | 100 wt % PPH1 | 3 | 161.25 |
| PPH2 | 100 wt % PPH2 | 1.8 | 161 |
| PPH3 | 100 wt % PPH3 | 0.3 | 162.8 |
| Blend A | 70 wt % PPR + 30 PPH1 wt % | 2.89 | 153.77 |
| Blend B according to the invention | 80 wt % PPR1 + 20 wt % of PPH3 | 18 | 155.12 |

Sheet Preparation and Thermoforming:

The compositions described in Table 1 were extruded into 1 mm thick sheets as described herein above. The so-obtained sheets were thermoformed as described above for the determination of the thermoforming window. Extrusion and thermoforming conditions are indicated in table 2.

TABLE 2

| Process | Parameters | PPH2 | PPR | Blend A | PPH3 | Blend B (PPR1 + PPH3) |
|---|---|---|---|---|---|---|
| Extrusion | Temperature melt (° C.) | 241 | 229 | 241 | 247 | 199 |
| | Flow (kg/h) | 2 | 2 | 2 | 2 | 2 |
| Calendering | Calender speed (rpm) | 0.23 | 0.23 | 0.23 | 0.45-0.47 | 0.3 |
| | Calender temperature (° C.) | 90 | 65 | 80 | 115 | 85 |
| Thermoforming | Punch depth (mm) | 68 mm (38 mm form the surface of the sheet) | 68 mm (38 mm form the surface of the sheet) | 68 mm (38 mm form the surface of the sheet) | 68 mm (38 mm form the surface of the sheet) | 68 mm (38 mm form the surface of the sheet) |
| | Punching speed (cm/s) | 25 | 25 | 25 | 25 | 25 |
| | Punch temperature (° C.) | 100 | 100 | 100 | 100 | 100 |
| | Blowing time (s) | 5 | 5 | 5 | 5 | 5 |

Following the previously described procedure the top load and thermoforming window was determined. Results for the thermoforming window and the maximum top load, as well as thickness distribution are indicated in table 3 and in the figures.

Figure 2:
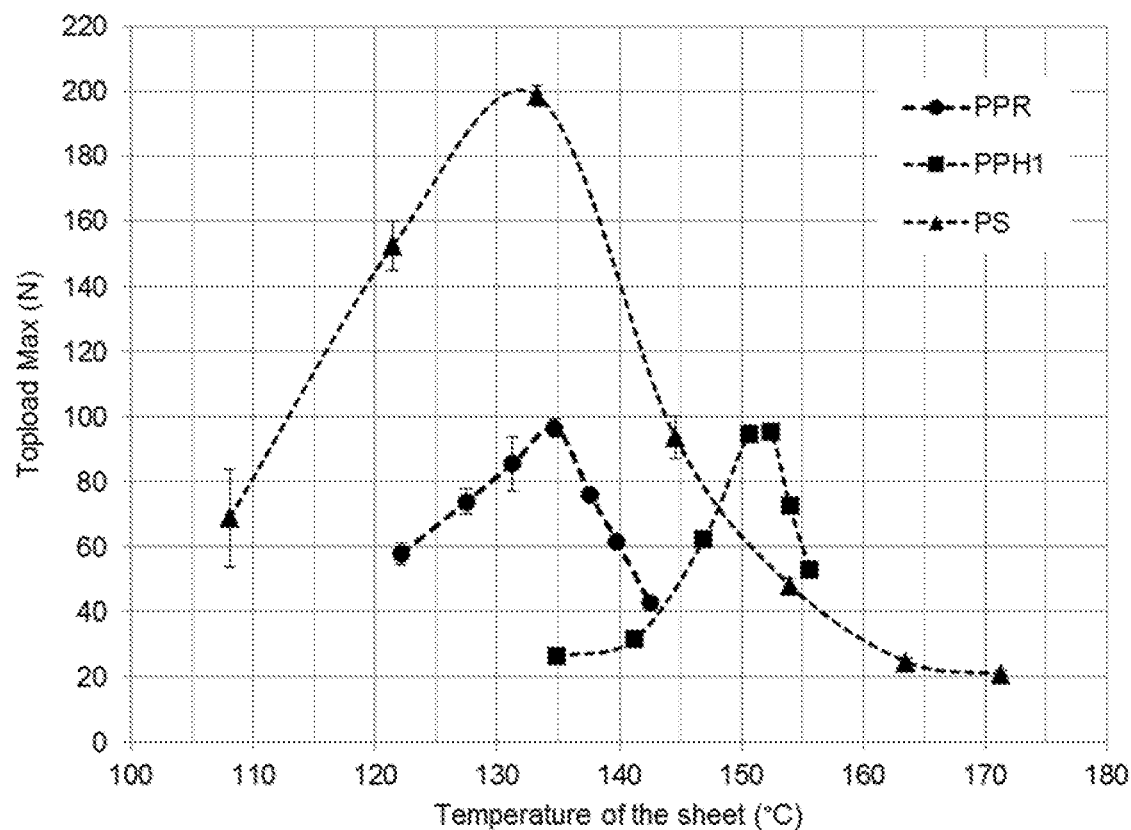
FIG. 2 represents a graph plotting the max top load as a function of the thermoforming temperature for sheets made of PS, PPR, and PPH1, respectively.
Figure 3A:
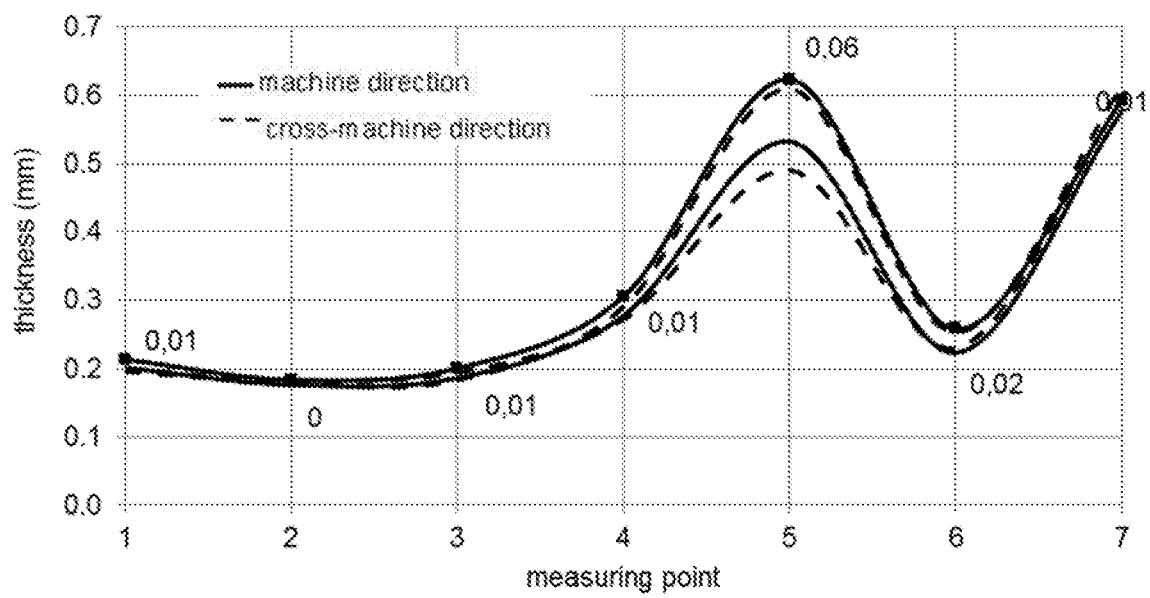
FIGS. 3A and 3B represent graphs plotting the thickness of the walls of thermoformed cups made of PPR and PPH1, respectively.
Figure 3B:
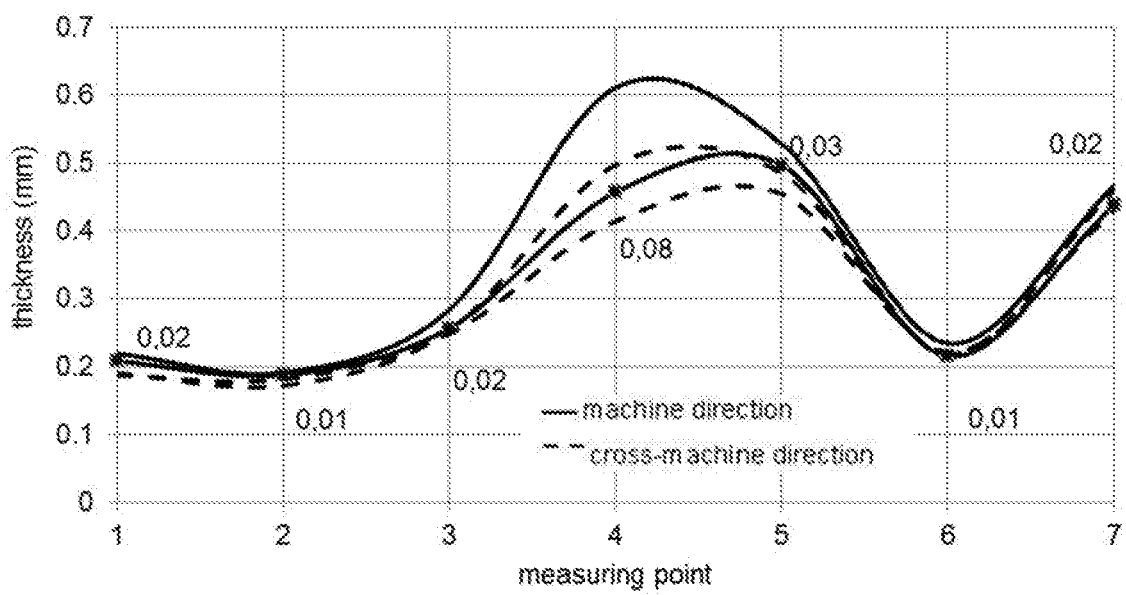
Figure 4:
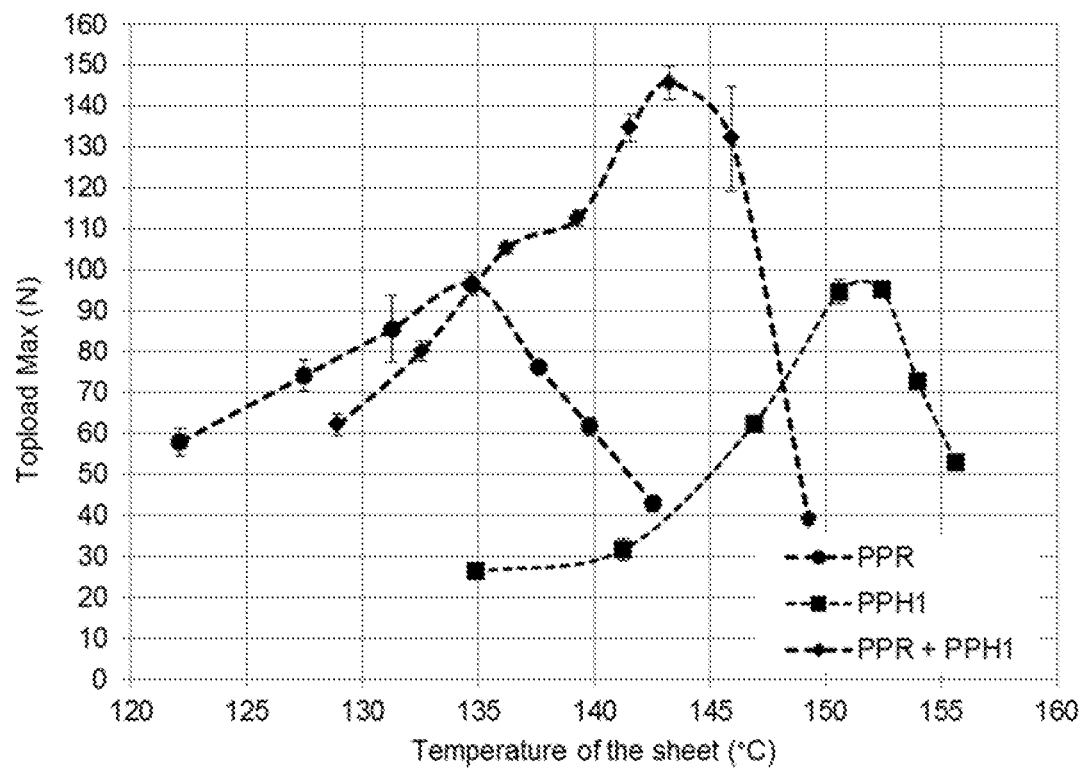
FIG. 4 represents a graph plotting the max top load as a function of the thermoforming temperature for sheets made of a composition comprising PPH1 and PPR, and sheets made of each component separately.
Figure 5:
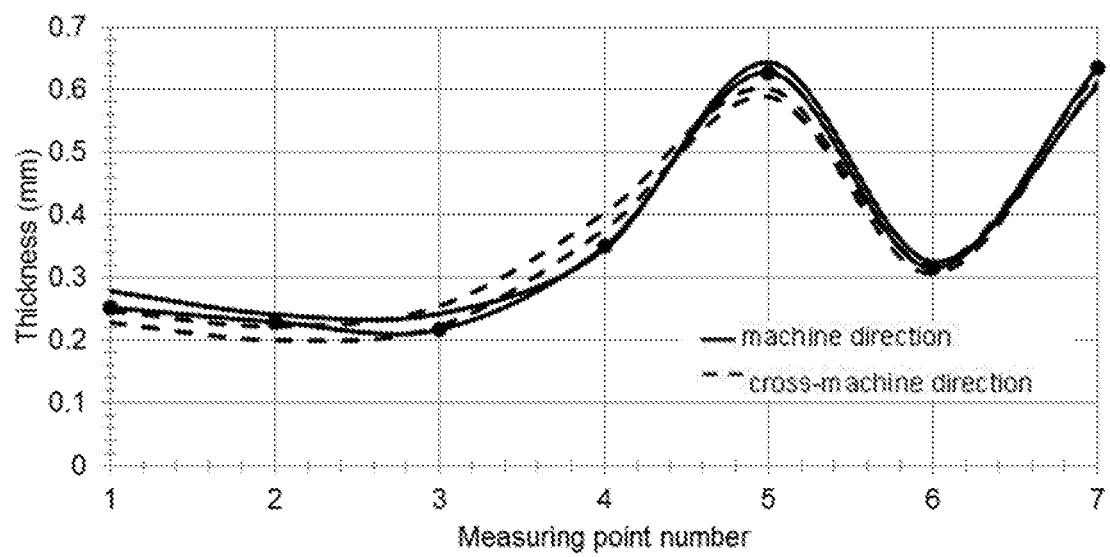
FIG. 5 represents a graph plotting the thickness of the wall of a thermoformed cup made of a composition comprising PPH1 and PPR.
Figure 6:
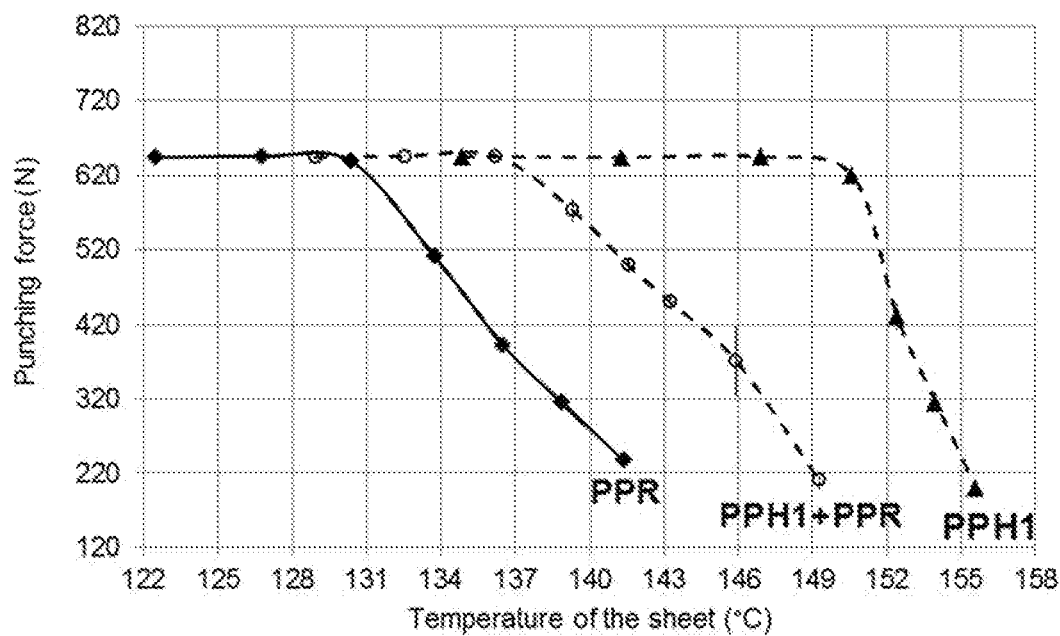
FIG. 6 represents a graph plotting the evolution of the punch force as a function of the thermoforming temperature for a sheet made of compositions comprising PPH1 and PPR, and for sheets made of PPR and PPH1 separately.

FIG. 2 represents a plot showing the temperature ranges for thermoforming sheets made of PS, PPR, and PPH1. FIG. 3A represents a plot showing the thickness of the walls of thermoformed cups made of PPR. FIG. 3B represents a plot showing the thickness of the walls of thermoformed cups made of PPH1. FIG. 4 represents a plot showing the temperature ranges for thermoforming sheets made of blend A, and sheets made of each component separately. FIG. 5 represents a graph plotting the thickness of the wall of a thermoformed cups made of blend A (143.2° C. and 145.7N). FIG. 6 represents a graph plotting the evolution of the punch force as a function of the temperature for sheet made of blend A, and for sheets made of PPR and PPH1 separately.

Figure 7:
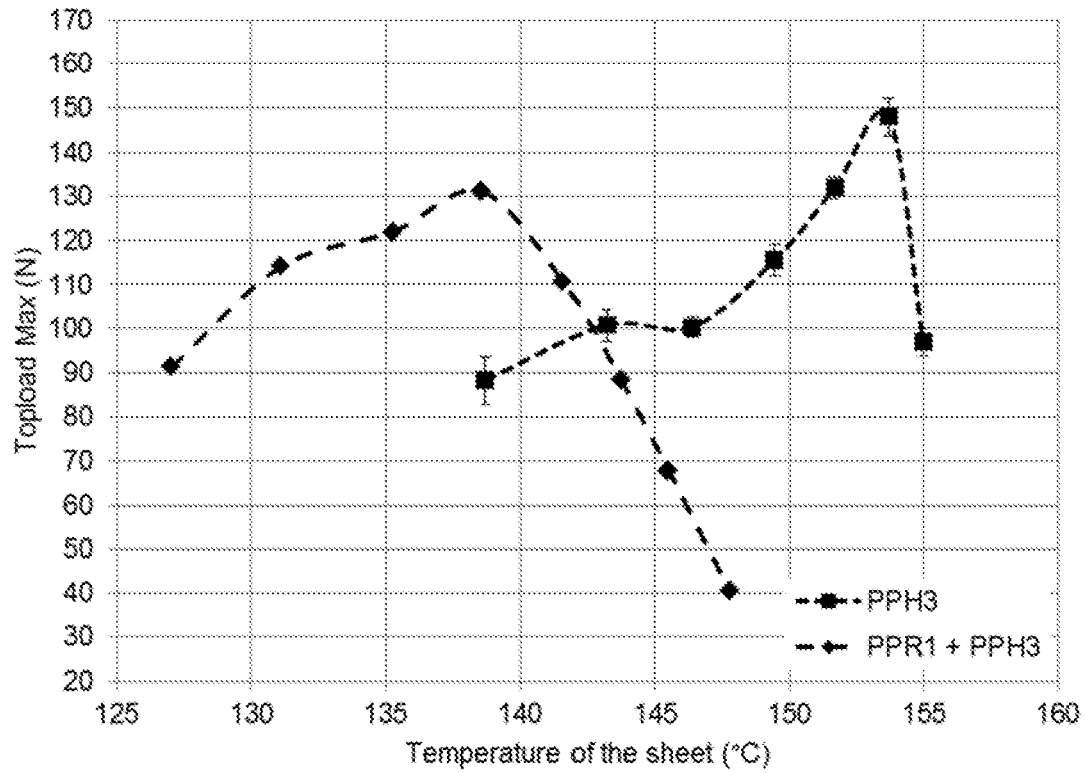
FIG. 7 represents a graph plotting the max top load as a function of the thermoforming temperature for a thermoforming sheet made of a composition according to embodiments of the invention, compared to a sheet made of PPH3 alone.
Figure 8:
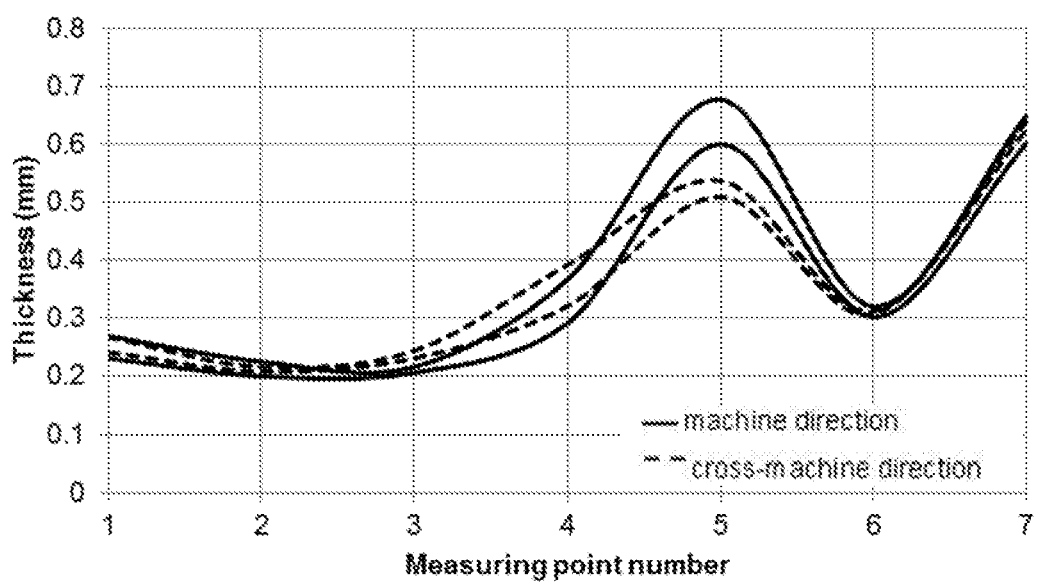
FIG. 8 represents a graph plotting the thickness of the wall of a thermoformed cup made of a composition according to embodiments of the invention.

FIG. 7 represents a plot showing the temperature ranges for thermoforming sheets made of blend B and sheets made of PPH3. The PPR1 curve was not shown, because it is too thin to be thermoformed. The curve for PPH3 showed a high Top Load (150N), but its thermoforming temperature window of implementation was very limited (4° C.). FIG. 8 represents a graph plotting the thickness of the wall of a thermoformed cup made of blend B (PPR1+PPH3) (138.5° C./131.2N). Blend B according to the invention comprises 80 wt % of a very fluid PPR1 (MFI 40 g/10 min) and 20 wt % of a highly viscous PPH3 (MFI 0.3 g/10 min). This blend formed a bimodal mixture in molecular weight and composition.

TABLE 3

| | Thickness distribution | Top load (N) | Coloration | thermoforming window (° C.) | Punching |
|---|---|---|---|---|---|
| PS | +++ | 200 | white | 15 | very easy |
| PPR | + | 100 | transparent/ shiny | 8-9 | difficult |

TABLE 3-continued

| | Thickness distribution | Top load (N) | Coloration | thermoforming window (° C.) | Punching |
|---|---|---|---|---|---|
| PPH1 | − | 100 | opaque | 4 | easy |
| PPH2 | − | 125 | opaque | 8 | easy |
| PPH3 | −− | 150 | opaque/ rough | 4 | easy |
| Blend A | ++ | 145 | transparent | 7 | easy |
| Blend B | ++ | 130 | transparent | 13 | very easy |

The present inventors have been very surprised to see that the thermoformed cups made with the polypropylene composition according to the present invention retain the mechanical properties of a polypropylene homopolymer but at the same time have a significantly wider processing window. The thermoformed cups made with the polypropylene composition according to the present invention had also good wall thickness distribution. The present inventors have been very surprised to see that productivity of the thermoforming unit could be significantly increased, for example a 10% increase of productivity was observed.

The invention claimed is:

1. A polypropylene composition for thermoforming comprising:
   from 80% by weight to at most 90% by weight of a polypropylene A, based on the total weight of the polypropylene composition, wherein the polypropylene A is a polypropylene random copolymer comprising 2.5% to 3.5% of ethylene, wherein the melt flow index of the polypropylene A is 35 g/10 min to 40 g/10 min, as measured according to the method of standard ISO 1133, condition M, at 230° C. and under a load of 2.16 kg; and
   from 10% by weight to at most 20% by weight of a polypropylene B, based on the total weight of the polypropylene composition, wherein the polypropylene B is a polypropylene homopolymer, wherein the melt flow index of the polypropylene B is 0.3 g/10 min to less than 0.5 g/10 min, as measured according to the method of standard ISO 1133, condition M, at 230° C. and under a load of 2.16 kg, wherein the polypropylene B comprises a flexural modulus ranging from 1500 MPa to 1550 MPa; and
   wherein the polypropylene composition comprises a thermoforming window of 13° C.

2. The polypropylene composition according to claim 1, wherein the polypropylene A comprises at least 3.0 wt % to 3.5% wt of ethylene.

3. The polypropylene composition according to claim 1, wherein the difference between the melting point of the polypropylene B and the melting point of the polypropylene A is at least 5.0° C., with the melting point being measured according to ISO 3146.

4. The polypropylene composition according to claim 1, wherein the melt flow index of the polypropylene A is 40 g/10 min.

5. The polypropylene composition according to claim 1, wherein the polypropylene composition comprises 80% by weight of the polypropylene A, and 20% by weight of the polypropylene B.

6. The polypropylene composition according to claim 1, wherein the melt flow index of the polypropylene composition is at least 1.0 g/10 min and at most 30 g/10 min, as measured according to the method of standard ISO 1133, condition M, at 230° C. and under a load of 2.16 kg.

7. A thermoformed article comprising the polypropylene composition of claim 1.

8. A thermoformable sheet comprising the polypropylene composition according to claim 1.

9. A process for preparing an article, comprising the steps of:
   a) providing a the polypropylene composition from claim 1;
   b) forming a sheet with the polypropylene composition obtained in the step a);
   c) thermoforming the sheet formed in the step b) into an article.

10. The process according to claim 9, wherein the step c) is performed in a form- fill-and-seal line.

* * * * *